United States Patent
Kim et al.

(10) Patent No.: US 11,277,796 B2
(45) Date of Patent: Mar. 15, 2022

(54) METHOD FOR PERFORMING COMMUNICATION IN WIRELESS LAN SYSTEM, AND WIRELESS TERMINAL USING SAME

(71) Applicant: LG ELECTRONICS INC., Seoul (KR)

(72) Inventors: Jeongki Kim, Seoul (KR); Kiseon Ryu, Seoul (KR); Jinsoo Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/968,100

(22) PCT Filed: Feb. 7, 2019

(86) PCT No.: PCT/KR2019/001526
§ 371 (c)(1),
(2) Date: Aug. 6, 2020

(87) PCT Pub. No.: WO2019/156478
PCT Pub. Date: Aug. 15, 2019

(65) Prior Publication Data
US 2021/0029640 A1    Jan. 28, 2021

Related U.S. Application Data

(60) Provisional application No. 62/627,145, filed on Feb. 6, 2018.

(51) Int. Cl.
*H04W 52/02*    (2009.01)
*H04L 27/02*    (2006.01)
*H04W 84/12*    (2009.01)

(52) U.S. Cl.
CPC ......... *H04W 52/0235* (2013.01); *H04L 27/02* (2013.01); *H04W 84/12* (2013.01)

(58) Field of Classification Search
CPC .. H04L 27/02; H04W 52/02; H04W 52/0235; H04W 84/12; Y02D 30/70
See application file for complete search history.

(56) References Cited

U.S. PATENT DOCUMENTS 10,863,437 B1 * 12/2020 Noh .................. H04B 7/0452
2017/0223754 A1 * 8/2017 Li ..................... H04W 12/02
(Continued)

FOREIGN PATENT DOCUMENTS

| KR | 20150113046 | 10/2015 |
| KR | 20170129141 | 11/2017 |
| WO | 2018/016757 | 1/2018 |

OTHER PUBLICATIONS

PCT International Application No. PCT/KR2019/001526, International Search Report dated May 8, 2019, 2 pages.
(Continued)

*Primary Examiner* — Tan H Trinh
(74) *Attorney, Agent, or Firm* — Lee Hong Degerman Kang Waimey

(57) ABSTRACT

Disclosed is a method for communicating in a wireless LAN system performed by a first wireless terminal, the method including: generating a wake-up packet modulated by an On-Off Keying (OOK) technique wherein the wake-up packet comprises a plurality of identification information for a plurality of second wireless terminals, each of the plurality of identification information is generated based on a bit length unit having a fixed size, and the bit length unit having the fixed size is set to 12 bits; and transmitting the wakeup packet to the plurality of second wireless terminals.

6 Claims, 25 Drawing Sheets

(56) References Cited

U.S. PATENT DOCUMENTS

| | | | |
|---|---|---|---|
| 2018/0007629 A1* | 1/2018 | Dorrance | H04L 27/06 |
| 2019/0159127 A1* | 5/2019 | Son | H04W 52/0219 |
| 2019/0253972 A1* | 8/2019 | Park | H04W 84/12 |
| 2020/0015166 A1* | 1/2020 | Ahn | H04W 52/0235 |
| 2020/0045635 A1* | 2/2020 | Lin | H04L 27/2627 |
| 2020/0092815 A1* | 3/2020 | Kim | H04W 28/06 |
| 2020/0367169 A1* | 11/2020 | Kim | H04L 27/2697 |
| 2020/0404588 A1* | 12/2020 | Kim | H04W 52/02 |
| 2021/0076329 A1* | 3/2021 | Kasslin | H04W 76/28 |
| 2021/0099955 A1* | 4/2021 | Kim | H04L 27/26 |
| 2021/0258877 A1* | 8/2021 | Chitrakar | H04W 52/0216 |

OTHER PUBLICATIONS

Intel Corporation et al., Proposal for LP-WUR (Low-Power Wake-Up Receiver) Study Group, IEEE 802.11-16/0605r3, May 17, 2016, 16 pages.

* cited by examiner

FIG. 1
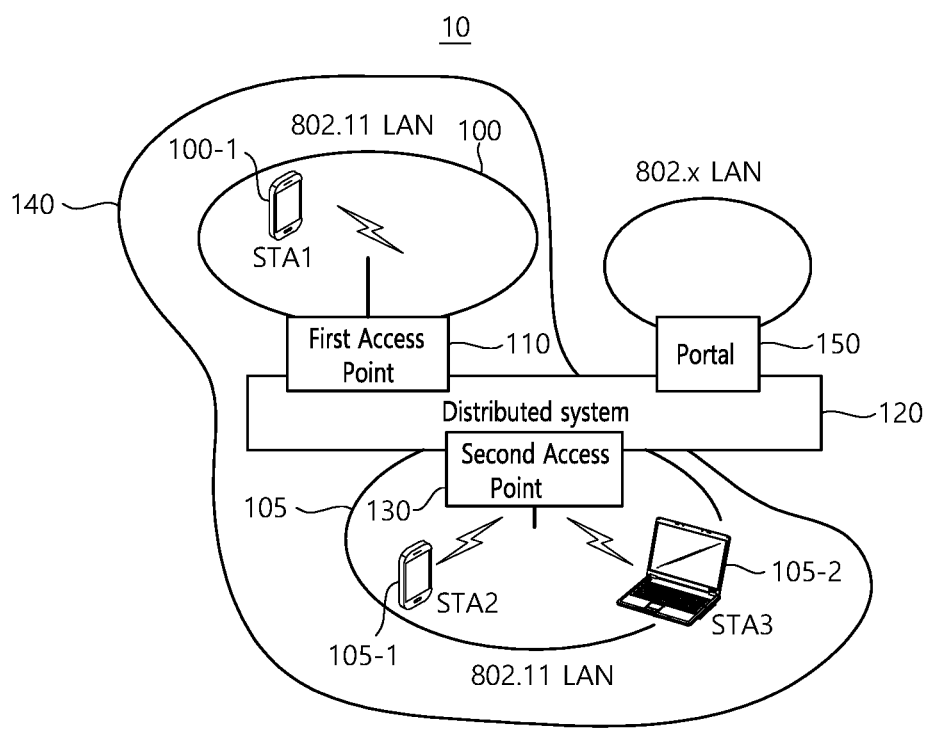
(A)
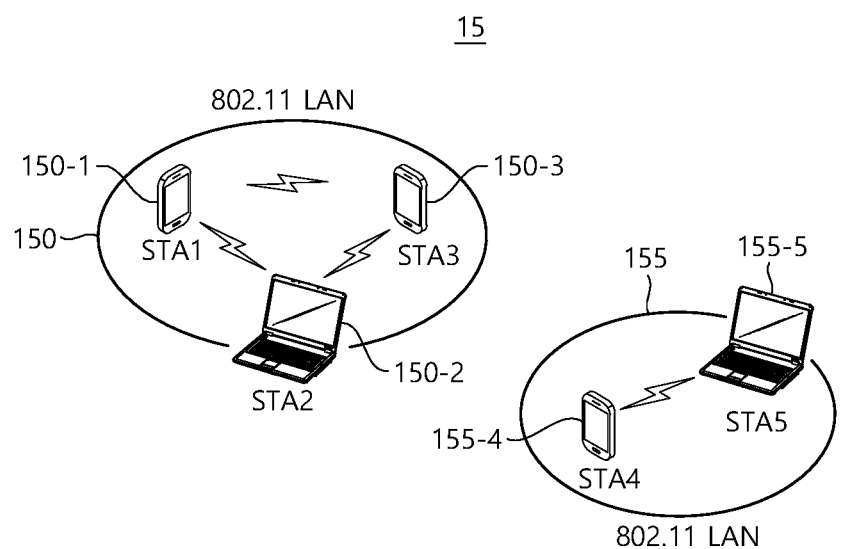
(B)

| B0    B2 | B3 | B4    B6 | B7 |
|---|---|---|---|
| Type | Length Present | Length/Misc | Protected |

Bits:  3             1            3            1
      1210         1220         1230         1240

METHOD FOR PERFORMING COMMUNICATION IN WIRELESS LAN SYSTEM, AND WIRELESS TERMINAL USING SAME

CROSS-REFERENCE TO RELATED APPLICATIONS

This application is the National Stage filing under 35 U.S.C. 371 of International Application No. PCT/KR2019/001526, filed on Feb. 7, 2019, which claims the benefit of U.S. Provisional Application No. 62/627,145, filed on Feb. 6, 2018, the contents of which are all hereby incorporated by reference herein in their entirety.

TECHNICAL FIELD

The present disclosure relates to wireless communication, and more particularly, to a method for communicating in a wireless LAN system and a wireless terminal using the same.

BACKGROUND ART

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

DISCLOSURE

Technical Problem

An object of the present disclosure is to provide a method for communicating in a wireless LAN system having improved performance in terms of overhead and a wireless terminal using the same.

Technical Solution

According to an aspect of the present disclosure, there is provided method for communicating in a wireless LAN system performed by a first wireless terminal, the method including: generating a wake-up packet modulated by an On-Off Keying (OOK) technique wherein the wake-up packet comprises a plurality of identification information fields for a plurality of second wireless terminals, each of the plurality of identification information fields is generated based on a bit length unit having a fixed size, and the bit length unit having the fixed size is set to 12 bits; and transmitting the wakeup packet to the plurality of second wireless terminals.

Advantageous Effects

According to an embodiment of the present disclosure, a method for communicating in a wireless LAN system having improved performance and a wireless terminal using the same are provided.

DESCRIPTION OF DRAWINGS

FIG. 1 is a conceptual diagram illustrating a structure of a WLAN system.

FIG. 12 is a diagram illustrating a structure of a frame control field of a WUR frame according to an embodiment.

MODE FOR DISCLOSURE

Figure 2:
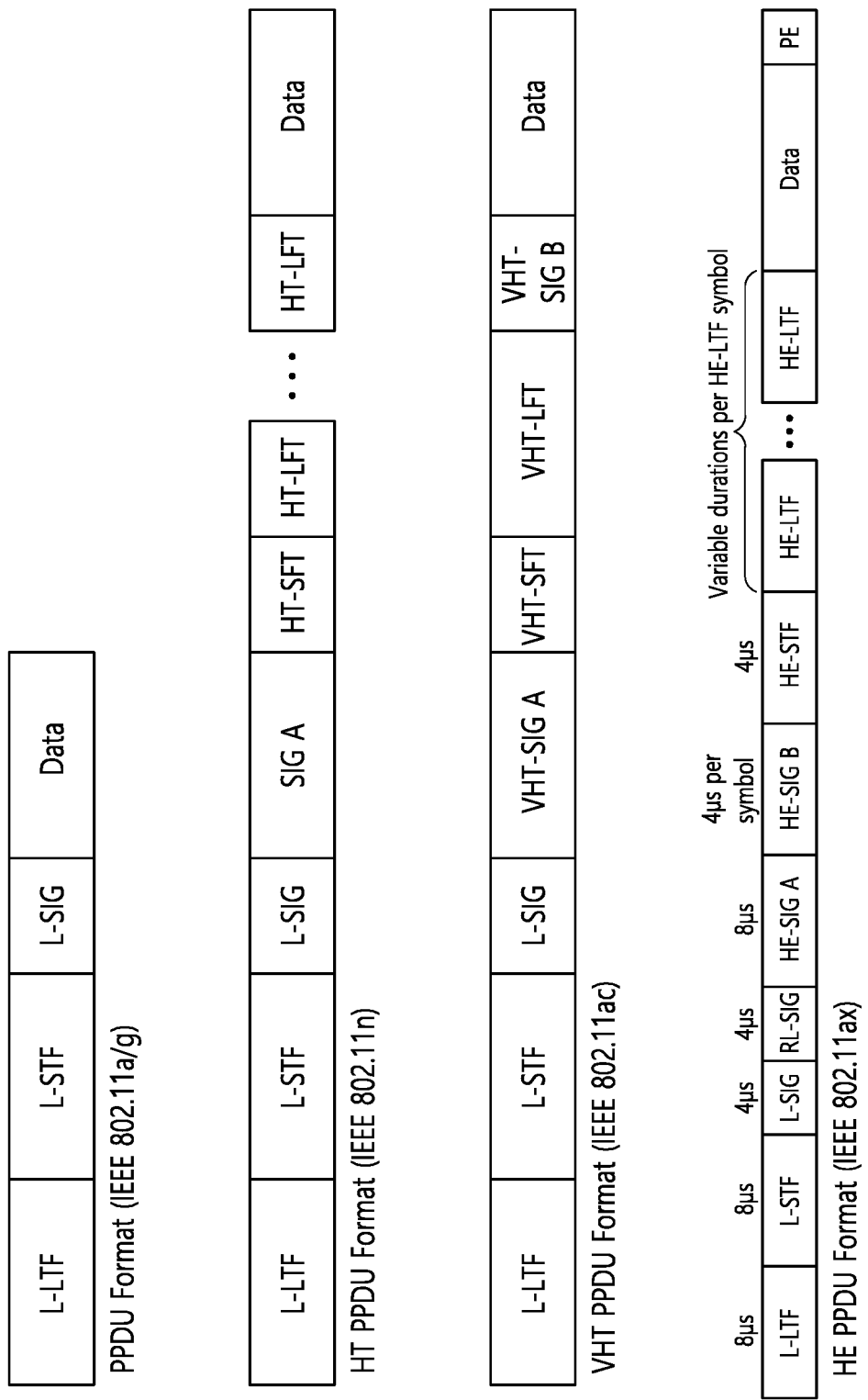
FIG. 2 is a diagram illustrating an example of a PPDU used in an IEEE standard.

The above-described features and the following detailed description are exemplary contents for helping a description and understanding of the present specification. That is, the present specification is not limited to this embodiment and may be embodied in other forms. The following embodiments are merely examples to fully disclose the present specification, and are descriptions to transfer the present specification to those skilled in the art. Therefore, when there are several methods for implementing components of the present specification, it is necessary to clarify that the present specification may be implemented with a specific one of these methods or equivalent thereof.

In the present specification, when there is a description in which a configuration includes specific elements, or when there is a description in which a process includes specific steps, it means that other elements or other steps may be further included. That is, the terms used in the present specification are only for describing specific embodiments and are not intended to limit the concept of the present specification. Furthermore, the examples described to aid the understanding of the present specification also include complementary embodiments thereof.

The terms used in the present specification have the meaning commonly understood by one of ordinary skill in the art to which the present specification belongs. Terms commonly used should be interpreted in a consistent sense in the context of the present specification. Further, terms used in the present specification should not be interpreted in an idealistic or formal sense unless the meaning is clearly defined. Hereinafter, embodiments of the present specification will be described with reference to the accompanying drawings.

FIG. 1 is a conceptual diagram illustrating a structure of a WLAN system. FIG. 1(A) illustrates a structure of an infrastructure network of institute of electrical and electronic engineers (IEEE) 802.11.

Referring to FIG. 1(A), a WLAN system 10 of FIG. 1(A) may include at least one basic service set (hereinafter, referred to as 'BSS') 100 and 105. The BSS is a set of access points (hereinafter, APs) and stations (hereinafter, STAs) that can successfully synchronize and communicate with each other and is not a concept indicating a specific area.

For example, a first BSS 100 may include a first AP 110 and one first STA 100-1. A second BSS 105 may include a second AP 130 and one or more STAs 105-1 and 105-2.

The infrastructure BSSs 100 and 105 may include at least one STA, APs 110 and 130 for providing a distribution service, and a distribution system (DS) 120 for connecting a plurality of APs.

The DS 120 may connect a plurality of BSSs 100 and 105 to implement an extended service set (hereinafter, 'ESS') 140. The ESS 140 may be used as a term indicating one network to which at least one AP 110 and 130 is connected through the DS 120. At least one AP included in one ESS 140 may have the same service set identification (hereinafter, SSID).

A portal 150 may serve as a bridge for connecting a WLAN network (IEEE 802.11) with another network (e.g., 802.X).

In a WLAN having a structure as illustrated in FIG. 1(A), a network between the APs 110 and 130 and a network between APs 110 and 130 and STAs 100-1, 105-1, and 105-2 may be implemented.

FIG. 1(B) is a conceptual diagram illustrating an independent BSS. Referring to FIG. 1(B), a WLAN system 15 of FIG. 1(B) may perform communication by setting a network between STAs without the APs 110 and 130, unlike FIG. 1(A). A network that performs communication by setting a network even between STAs without the APs 110 and 130 is defined to an ad-hoc network or an independent basic service set (hereinafter, 'BSS').

Referring to FIG. 1(B), an IBSS 15 is a BSS operating in an ad-hoc mode. Because the IBSS does not include an AP, there is no centralized management entity. Therefore, in the IBSS 15, STAs 150-1, 150-2, 150-3, 155-4, and 155-5 are managed in a distributed manner.

All STAs 150-1, 150-2, 150-3, 155-4, and 155-5 of the IBSS may be configured with mobile STAs, and access to a distributed system is not allowed. All STAs of the IBSS form a self-contained network.

The STA described in the present specification is a random function medium including a medium access control (hereinafter, MAC) following a standard of the Institute of Electrical and Electronics Engineers (IEEE) 802.11 standard and a physical layer interface for a wireless medium and may broadly be used as a meaning including both an AP and a non-AP station (STA).

The STA described in the present specification may also be referred to as various names such as a mobile terminal, a wireless device, a wireless transmit/receive unit (WTRU), a user equipment (UE), a mobile station (MS), a mobile subscriber unit, or simply a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

The present embodiment proposes an improved scheme for a signal (or control information field) used for a data field of a PPDU. The signal mentioned in the present embodiment may be applied onto high efficiency PPDU (HE PPDU) according to an IEEE 802.11ax standard. The signal mentioned in the present specification may be HE-SIG-A and/or HE-SIG-B included in the HE PPDU. For example, the HE-SIG-A and the HE-SIG-B may also be respectively represented as SIG-A and SIG-B. However, the signal mentioned in the present specification is not necessarily limited to an HE-SIG-A and/or HE-SIG-B standard and may be applied to control/data fields having various names, which include control information in a wireless communication system transferring user data.

In addition, the HE PPDU of FIG. 2 is an example of a PPDU for multiple users. The HE-SIG-B may be included only when the PPDU is for multiple users. The HE SIG-B may be omitted in a PPDU for a single user.

As illustrated, the HE-PPDU for multiple users (MUs) may include various fields such as legacy-short training field (L-STF), legacy-long training field (L-LTF), legacy-signal (L-SIG), high efficiency-signal A (HE-SIG A), high efficiency-signal-B (HE-SIG B), high efficiency-short training field (HE-STF), high efficiency-long training field (HE-LTF), data field (alternatively, a MAC payload), and packet extension (PE). Each of the fields may be transmitted during an illustrated time period (that is, 4 or 8 μs).

The PPDU used in the IEEE standard is mainly described as a PPDU structure transmitted with a channel bandwidth of 20 MHz. The PPDU structure transmitted with a bandwidth (e.g., 40 MHz and 80 MHz) wider than the channel bandwidth of 20 MHz may be a structure in which linear scaling is applied to the PPDU structure used in the channel bandwidth of 20 MHz.

The PPDU structure used in the IEEE standard may be generated based on 64 Fast Fourier Transforms (FTFs), and a cyclic prefix portion (CP portion) may be ¼. In this case, a length of an effective symbol interval (or FFT interval)

may be 3.2 us, a CP length may be 0.8 us, and symbol duration may be 4 us (3.2 us+0.8 us) that adds the effective symbol interval and the CP length.

Figure 3:
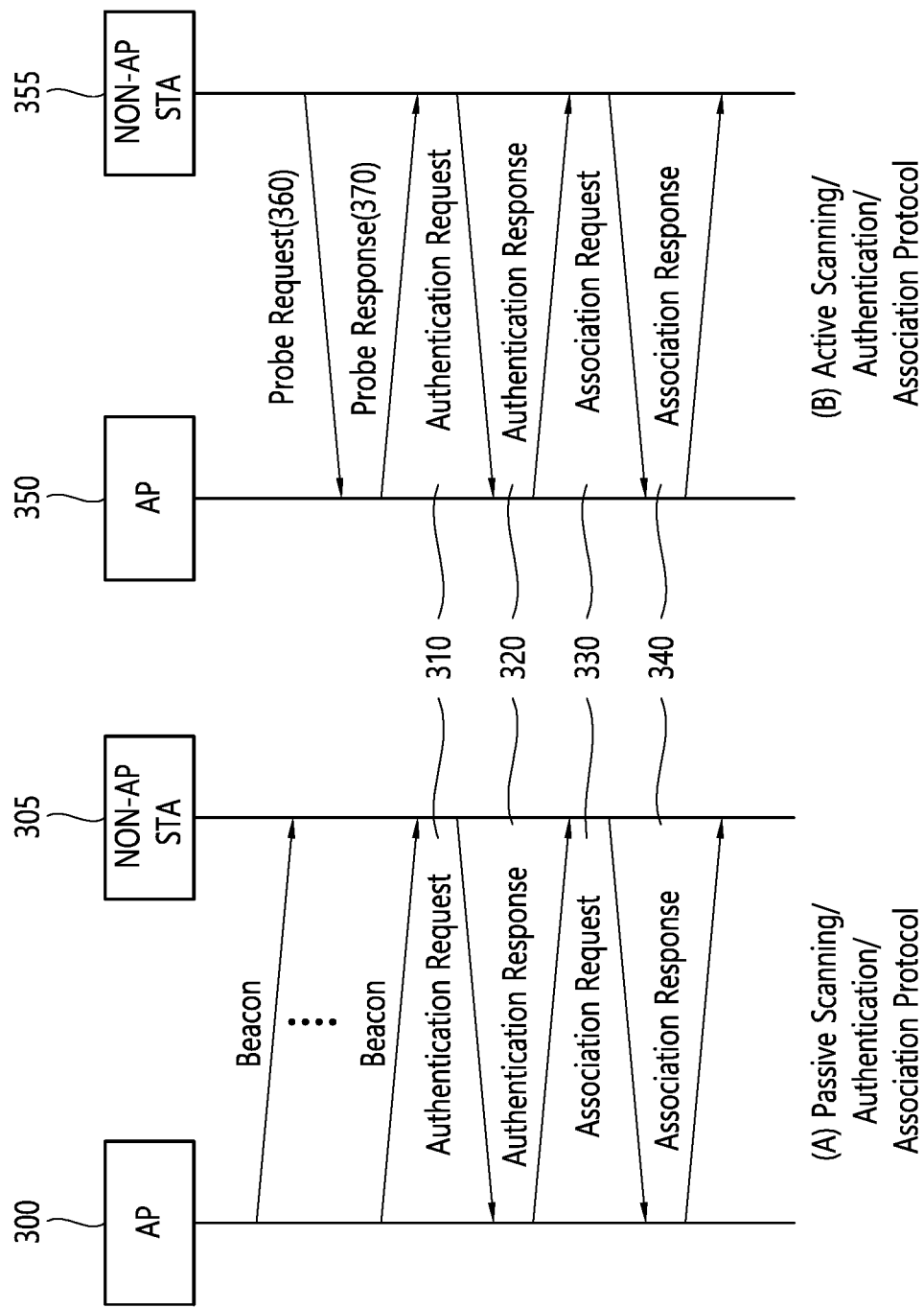
FIG. 3 is a conceptual view illustrating an authentication and association procedure after scanning of an AP and an STA.

FIG. 3 is a conceptual view illustrating an authentication and association procedure after scanning of an AP and an STA.

Referring to FIG. 3, a non-AP STA may perform the authentication and association procedure with respect to one AP among a plurality of APs which have completed a scanning procedure through passive/active scanning. For example, the authentication and association procedure may be performed through 2-way handshaking.

FIG. 3(A) is a conceptual view illustrating an authentication and association procedure after passive scanning, and FIG. 3(B) is a conceptual view illustrating an authentication and association procedure after active scanning.

The authentication and association procedure may be performed regardless of whether the active scanning or the passive scanning is used. For example, APs 300 and 350 exchange an authentication request frame 310, an authentication response frame 320, an association request frame 330, and an association response frame 340 with the non-AP STAs 305 and 355 to perform the authentication and association procedure.

More specifically, the authentication procedure may be performed by transmitting the authentication request frame 310 from the non-AP STAs 305 and 355 to the APs 300 and 350. The APs 300 and 350 may transmit the authentication response frame 320 to the non-AP STAs 305 and 355 in response to the authentication request frame 310. An authentication frame format is disclosed in IEEE 802.11 8.3.3.11.

More specifically, the association procedure may be performed when the non-AP STAs 305 and 355 transmit the association request frame 330 to the APs 300 and 305. The APs 300 and 350 may transmit the association response frame 340 to the non-AP STAs 305 and 355 in response to the association request frame 330.

The association request frame 330 may include information on capability of the non-AP STAs 305 and 355. The APs 300 and 350 may determine whether the non-AP STAs 305 and 355 can be supported based on the information on capability of the non-AP STAs 305 and 355 and included in the association request frame 330.

For example, if the support is available, the AP 300 and 350 may transmit to the non-AP STAs 305 and 355 by allowing the association response frame 340 to contain whether the association request frame 330 is acceptable, its reason, and its supportable capability information. An association frame format is disclosed in IEEE 802.11 8.3.3.5/8.3.3.6.

When up to the association procedure mentioned in FIG. 3 is performed, normal data transmission and reception procedures may be performed between the AP and the STA.

Figure 4:
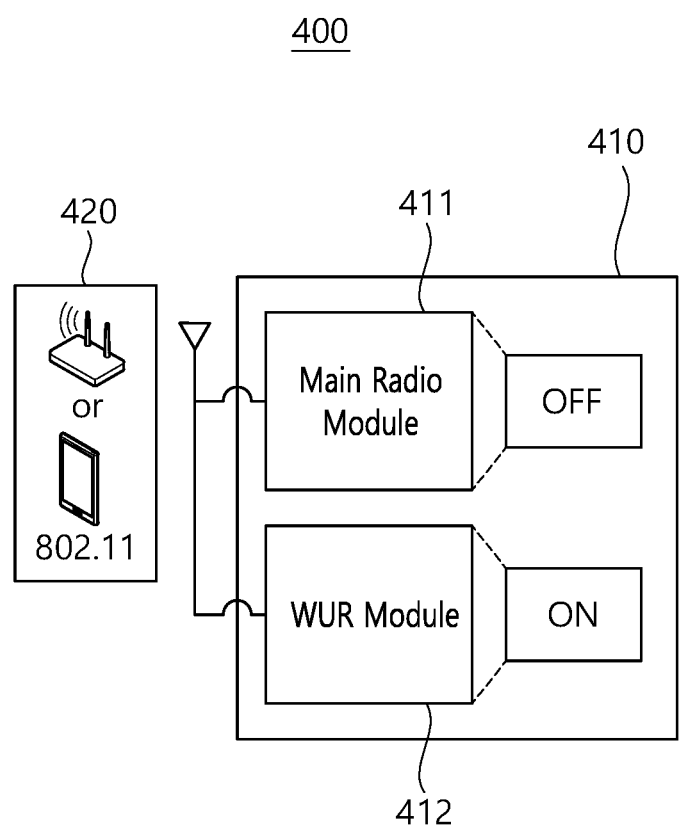
FIG. 4 is an internal block diagram of a wireless terminal receiving a wake-up packet.

FIG. 4 is an internal block diagram of a wireless terminal receiving a wake-up packet.

Referring to FIG. 4, a WLAN system 400 according to the present embodiment may include a first wireless terminal 410 and a second wireless terminal 420.

The first wireless terminal 410 may include a main radio module 411 related to main radio (e.g., 802.11 radio) and a WUR module 412 including low-power wake-up radio (LP WUR). In the present specification, the main radio module may be referred to as a primary component radio (hereinafter, PCR) module.

For example, the main radio module 411 may include a plurality of circuits supporting Wi-Fi, Bluetooth® radio (hereinafter, BT radio), and Bluetooth® Low Energy radio (hereinafter, BLE radio).

In the present specification, the first wireless terminal 410 may control the main radio module 411 in an awake state or a doze state.

For example, when the main radio module 411 is in the awake state, the first wireless terminal 410 is able to transmit an 802.11-based frame (e.g., 802.11-type PPDU) or receive an 802.11-based frame based on the main radio module 411. For example, the 802.11-based frame may be a non-HT PPDU of a 20 MHz band.

For another example, when the main radio module 411 is in the doze state, the first wireless terminal 410 is not able to transmit the 802.11-based frame (e.g., 802.11-type PPDU) or receive the 802.11-based frame based on the main radio module 411.

That is, when the main radio module 411 is in the doze state (e.g., OFF state), the first wireless terminal 400 is not able to receive a frame (e.g., 802.11-type PPDU) transmitted by the second wireless terminal 420 (e.g., AP) until the WUR module 412 wakes up the main radio module 411 to transition to the awake state according to a wake-up packet (hereinafter, WUP).

In the present specification, a WUR PPDU and a WUR frame can be understood as the same concept.

In the present specification, when a WUR MAC frame used to wake up the WUR module 412 in a turn-off state into a turn-on state is included in a WUR PPDU, the WUR PPDU may be referred to as a wake-up packet (hereinafter 'WUP').

In the present specification, a WUR frame of a WUR wake-up type for waking up the WUR module 412 in a turn-off state into a turn-on state may be referred to as a wake-up packet (WUP).

In the present specification, the first wireless terminal 410 can control the WUR module 412 such that it switches to a turn-off state or a turn-on state.

For example, the first wireless terminal 410 including the WUR module 412 in a turn-on state can receive (or demodulate) only a frame of a specific type (i.e., WUR PPDU) transmitted by the second wireless terminal 420 (for example, AP).

In this case, the frame of the specific type (i.e., WUR PPDU) may be a frame (e.g., wake-up packet) modulated according to an on-off keying (OOK) modulation method which will be described later with reference to FIG. 5.

For example, the first wireless terminal 410 including the WUR module 412 in a turn-off state cannot receive (or demodulate) a frame of a specific type (i.e., WUR PPDU) transmitted by the second wireless terminal 420 (for example, AP).

In the present specification, the first wireless terminal 410 can operate a main radio module (i.e., PCR module 411) and a WUR module 412.

For example, when the main radio module 411 is in a power save mode (hereinafter referred to as a PS mode)), the first wireless terminal 410 can control the main radio module 411 such that it alternates between a doze state and an awake state according to communication environment.

For example, when the WUR module 412 is in a WUR mode, the first wireless terminal 410 can control the WUR module 412 such that it alternates between a turn-on state and a turn-off state according to a state of the main radio module 411 and a duty cycle schedule agreed in advance for the WUR module.

Here, a wake-up packet modulated with OOK can be received based on the WUR module 412 in a turn-on state. In other words, the wake-up packet cannot be received based on the WUR module 412 in a turn-off state.

Specifically, when the main radio module 411 is in a doze state, the first wireless terminal 410 in a WUR mode controls the WUR module 412 such that it is in a turn-on state for a duty cycle schedule agreed between the first wireless terminal 410 and the second wireless terminal 420.

Further, when the main radio module 411 is in an awake-state, the first wireless terminal in the WUR mode may control the WUR module 412 such that it is in a turn-off state.

That is, a wireless terminal in the WUR mode may be understood as a wireless terminal having a negotiation status between an AP and a WUR STA, in which the WUR module alternates between a turn-of state and a turn-off state when the main radio module is in a doze state.

For example, the first wireless terminal 410 in the WUR mode can receive a wake-up packet (WUP) based on the WUR module 412 in a turn-on state. Further, when the WUR module 412 receives a WUP, the first wireless terminal 410 in the WUR mode can control the WUR module 412 such that it wakes the main radio module 411 up.

In the present specification, the terms "awake state" and "turn-on state" may be interchanged in order to indicate an ON state of a specific module included in a wireless terminal. In the same context, the terms "doze state" and "turn-off state" may be interchanged in order to indicate an OFF state of a specific module included in a wireless terminal.

The first wireless terminal 410 according to the present embodiment can receive a legacy frame (e.g., a PPDU based on 802.11) from another wireless terminal 420 (e.g., AP) based on the main radio module 411 or the WUR module 412 in an awake state.

The WUR module 412 may be a receiver for switching the main radio module 411 in a doze state to an awake state. That is, the WUR module 412 may not include a transmitter.

The first wireless terminal 410 can operates the WUR module 412 in a turn-on state for a duration in which the main radio module 411 is in a doze state.

For example, when a WUP is received based on the WUR module 412 in a turn-on state, the first wireless terminal 410 can control the main radio module 411 in a doze state such that it switches to an awake state.

For reference, a low power wake-up receiver (LP WUR) included in the WUR module 412 aims at target power consumption of less than 1 mW. Further, the LP WUR may use a narrow bandwidth of less than 5 MHz.

In addition, power consumption of the LP WUR may be less than 1 Mw. Further, a target transmission range of the LP WUR may be the same as that of the legacy 802.11.

The second wireless terminal 420 according to the present embodiment can transmit user data based on main radio (i.e., 802.11). The second wireless terminal 420 can transmit a WUP for the WUR module 412.

In the present specification, when a wireless terminal includes the main radio module and the WUR module, the wireless terminal may be referred to as a WUR STA.

Figure 5:
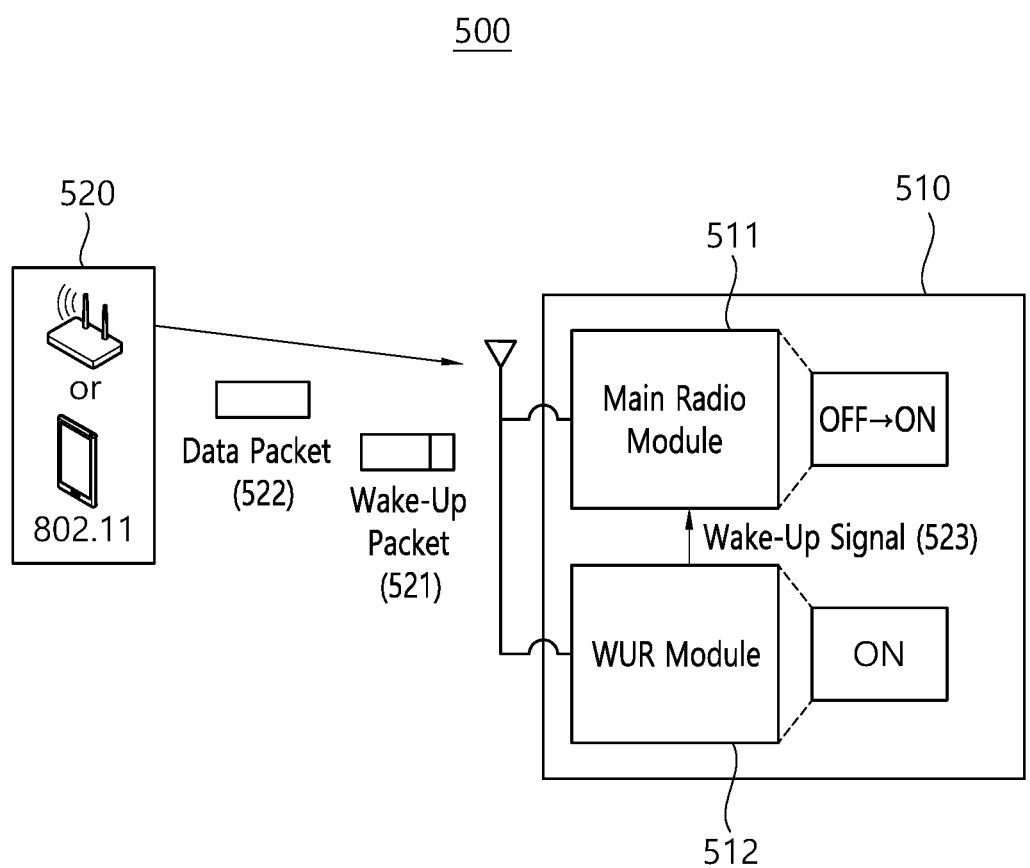
FIG. 5 is a conceptual diagram illustrating a method in which a wireless terminal receives a wake-up packet and a data packet.

FIG. 5 is a conceptual diagram illustrating a method in which a wireless terminal receives a wake-up packet and a data packet.

Referring to FIG. 4 and FIG. 5, a WLAN system 500 according to the present embodiment may include a first wireless terminal 510 corresponding to a receiving terminal and a second wireless terminal 520 corresponding to a transmitting terminal.

A basic operation of the first wireless terminal 510 of FIG. 5 may be understood through a description of the first wireless terminal 410 of FIG. 4. Similarly, a basic operation of the second wireless terminal 520 of FIG. 5 may be understood through a description of the second wireless terminal 420 of FIG. 4.

Referring to FIG. 5, the wake-up packet 521 may be received in a WUR module 512 in a turn-on state (e.g., ON state).

In this case, the WUR module 512 may transfer a wake-up signal 523 to a main radio module 511 in a doze state (e.g., OFF state) in order to accurately receive a data packet 522 to be received after the wake-up packet 521.

For example, the wake-up signal 523 may be implemented based on an internal primitive of the first wireless terminal 510.

For example, when the wake-up signal 523 is received in the main radio module 511 in the doze state (e.g., OFF state), the first wireless terminal 510 may control the main radio module 511 to transition to the awake state (i.e., ON state).

For example, when the main radio module 511 transitions from the doze state (e.g., OFF state) to the awake state (i.e., ON state), the first wireless terminal 510 may activate all or some of a plurality of circuits (not shown) supporting Wi-Fi, BT radio, and BLE radio included in the main radio module 511.

For another example, actual data included the wake-up packet 521 may be directly transferred to a memory block (not shown) of a receiving terminal even if the main radio module 511 is in the doze state (e.g., OFF state).

For another example, when an IEEE 802.11 MAC frame is included in the wake-up packet 521, the receiving terminal may activate only a MAC processor of the main radio module 511. That is, the receiving terminal may maintain a PHY module of the main radio module 511 to be in an inactive state. The wake-up packet 521 of FIG. 5 will be described below in greater detail with reference to the accompanying drawings.

The second wireless terminal 520 may be configured to transmit the wake-up packet 521 to the first wireless terminal 510.

Referring to FIG. 5, to indicates that an individually addressed frame(s) for the first wireless terminal 510 is available through the main radio module 511 (i.e., to indicate the presence of an individually addressed frame(s) buffered by the second wireless terminal for the first wireless terminal), the second wireless terminal 520 can transmit a wake-up packet 521 to the first wireless terminal 510 associated with the second wireless terminal 520.

For example, the wake-up packet 521 may include information (e.g., a WUR ID) for identifying the first wireless terminal 510.

Alternatively, the wake-up packet 521 may include information (e.g., a group ID) for identifying a group of a plurality of wireless terminals including the first wireless terminal 510.

Alternatively, the wake-up packet 521 may include a plurality of identification information fields in a frame body field. Here, the plurality of identification information fields may include one for identifying the first wireless terminal 510.

Figure 6:
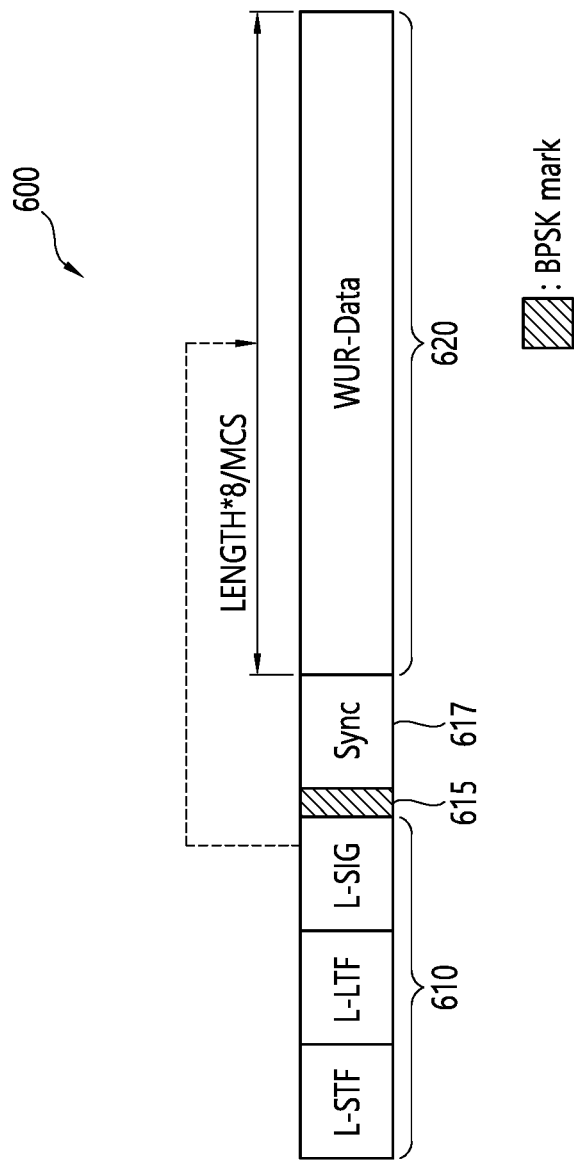
FIG. 6 illustrates an example of a WUR PPDU format.

FIG. 6 illustrates an example of a WUR PPDU format.

Referring to FIGS. 1 to 6, a wake-up radio (WUR) PPDU 600 may include a legacy preamble 610 defined in IEEE 802.11. In the present specification, the legacy preamble 610 may be understood as a 20 MHz non-HT preamble.

In addition, the WUR PPDU 600 may include a BPSK-mark symbol field 615, a synchronization (hereinafter 'Sync') field 617 and a WUR-data field 620 carrying a payload following the legacy preamble 610.

The WUR-data field 620 may be modulated using a simple modulation scheme (e.g., on-off keying (OOK)). That is, the WUR-data field 620 may include a payload for a reception terminal.

The legacy preamble 610 may be provided for coexistence with a legacy STA. An L-SIG field for protecting a packet may be used in the legacy preamble 610 for the coexistence.

For example, an 802.11 STA may detect a start portion of a packet through the L-STF field in the legacy preamble 610. The STA may detect an end portion of the 802.11 packet through the L-SIG field in the legacy preamble 610.

The legacy preamble 610 may be understood as a field for a third party legacy STA (STA not including LP-WUR). In other words, the legacy preamble 610 may not be decoded by the LP-WUR.

To reduce false alarm of an 802.11n terminal, a modulated BPSK-mark symbol field 615 may be added after L-SIG of FIG. 6.

For example, the BPSK-mark symbol field 615 may include a single symbol having a length of 4 μs modulated according to binary phase shift keying (BPSK). The BPSK-mark symbol field 615 may have a bandwidth of 20 MHz like a legacy part.

The WUR PPDU 600 may include a narrow band portion corresponding to the Sync field 617 and the WUR-data field 620 following the legacy preamble 610 and the 20 MHz BPSK-mark symbol 615.

The Sync field 617 may be configured based on a plurality of predefined sequences for discriminate from two data rates defined for the WUR-data field 620.

The Sync field 617 may be modulated according to OOK. The duration of the Sync field 617 may be determined based on a data rate of the WUR-data field 620.

For example, when a data rate applied to the WUR-data field 620 is a high data rate (250 kbps), the duration of the Sync field 617 may be 64 μs. When a data rate applied to the WUR-data field 620 is a low data rate (62.5 kbps), the duration of the Sync field 617 may be 128 μs.

That is, a WUR STA can ascertain whether a data rate applied to the WUR-data field 620 is a first data rate (62.5 kbps) for LDR or a second data rate (250 kbps) for HDR based on a result of detection of the Sync field 617.

The WUR-data field 620 may be modulated according to OOK. The WUR-data field 620 may be configured based on the first data rate (62.5 kbps) for LDR or the second data rate (250 kbps) for HDR The WUR-data field 620 may be encoded based on Manchester code as shown in Table 1 and Table 2 below.

For example, when HDR is applied to the WUR-data field 620, an ON/OFF symbol of the WUR-data field 620 according to OOK may be configured to have a 2μ length. In this case, a mapping relationship between ON/OFF symbols included in the WUR-data field 620 and an information bit to be finally acquired by a reception terminal may be as shown in Table 1 below.

TABLE 1

| Information bit | Encoded bit |
| --- | --- |
| 0 | 2μ ON + 2μ OFF |
| 1 | 2μ OFF + 2μ ON |

Referring to Table 1, an ON symbol having a 2μ length and an OFF symbol having a 2μ length included in the WUR-data field 620 can be interpreted as an information bit '0'. Further, an OFF symbol having a 2μ length and an ON symbol having a 2μ length included in the WUR-data field 620 can be interpreted as an information bit '1'.

For example, when LDR is applied to the WUR-data field 620, ON/OFF symbols of the WUR-data field 620 according to OOK may be configured to have a 4μ length. In this case, a mapping relationship between ON/OFF symbols included in the WUR-data field 620 and an information bit to be finally acquired by a reception terminal may be as shown in Table 2 below.

TABLE 2

| Information bit | Encoded bit |
| --- | --- |
| 0 | 4μ ON + 4μ OFF + 4μ ON + 4μ OFF |
| 1 | 4μ OFF + 4μ ON + 4μ OFF + 4μ ON |

Referring to Table 2, an ON symbol having a 4μ length and an OFF symbol having a 4μ length which are repeated twice and included in the WUR-data field 620 can be interpreted as an information bit '0'. Further, an OFF symbol having a 4μ length and an ON symbol having a 4μ length which are repeated twice and included in the WUR-data field 620 can be interpreted as an information bit '1'.

Referring to FIGS. 1 to 6, the second wireless terminal (e.g., 520) may be configured to generate and/or transmit the wake-up packet 521 or 600. The first wireless terminal (e.g., 510) may be configured to process the received wake-up packet 521.

Figure 7:
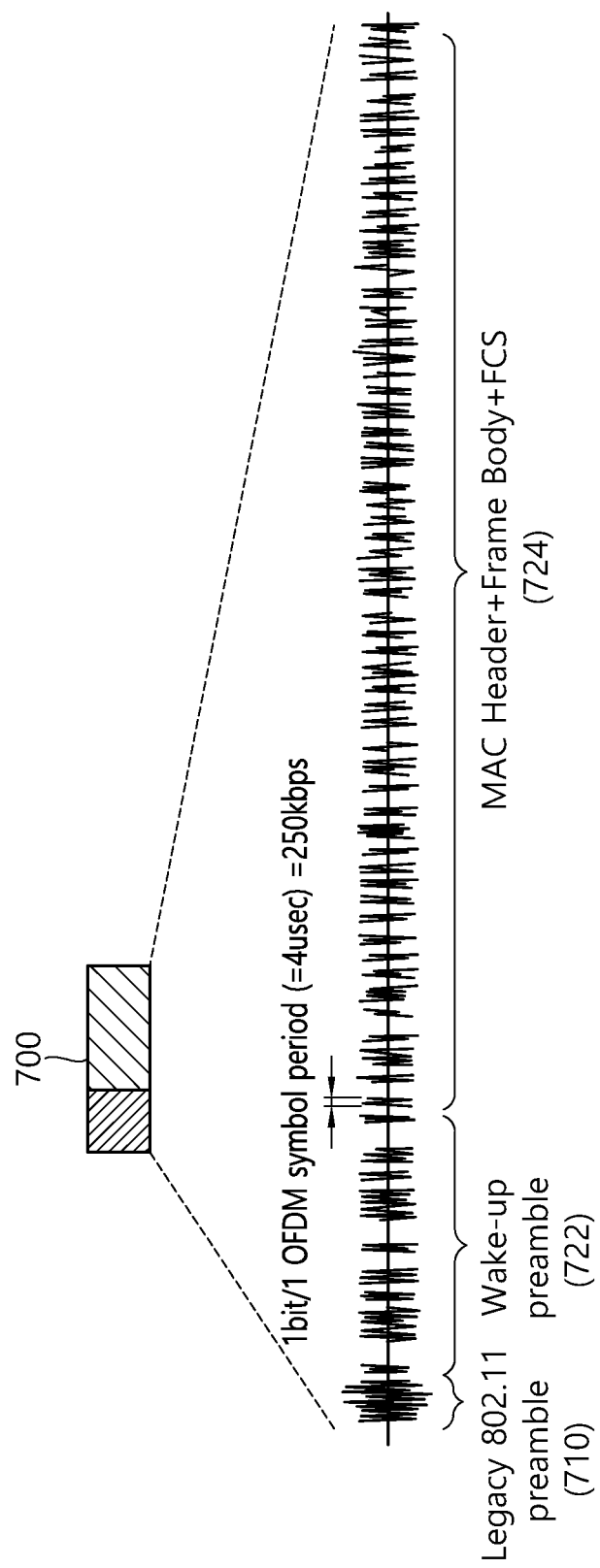
FIG. 7 illustrates a signal waveform of a wake-up packet.

FIG. 7 illustrates a signal waveform of a wake-up packet.

Referring to FIG. 7, a wake-up packet 700 may include a legacy preamble (802.11 preamble) 710 and payloads 722 and 724 modulated based on on-off keying (OOK). That is, the wake-up packet WUP according to the present embodiment may be understood in a form in which a legacy preamble and a new LP-WUR signal waveform coexist.

OOK may not be applied to the legacy preamble 710 of FIG. 7. As described above, the payloads 722 and 724 may be modulated according to the OOK. However, the wake-up preamble 722 included in the payloads 722 and 724 may be modulated according to another modulation scheme.

For example, it may be assumed that the legacy preamble 710 is transmitted based on a channel band of 20 MHz to which 64 FFTs are applied. In this case, the payloads 722 and 724 may be transmitted based on a channel band of about 4.06 MHz.

Figure 8:
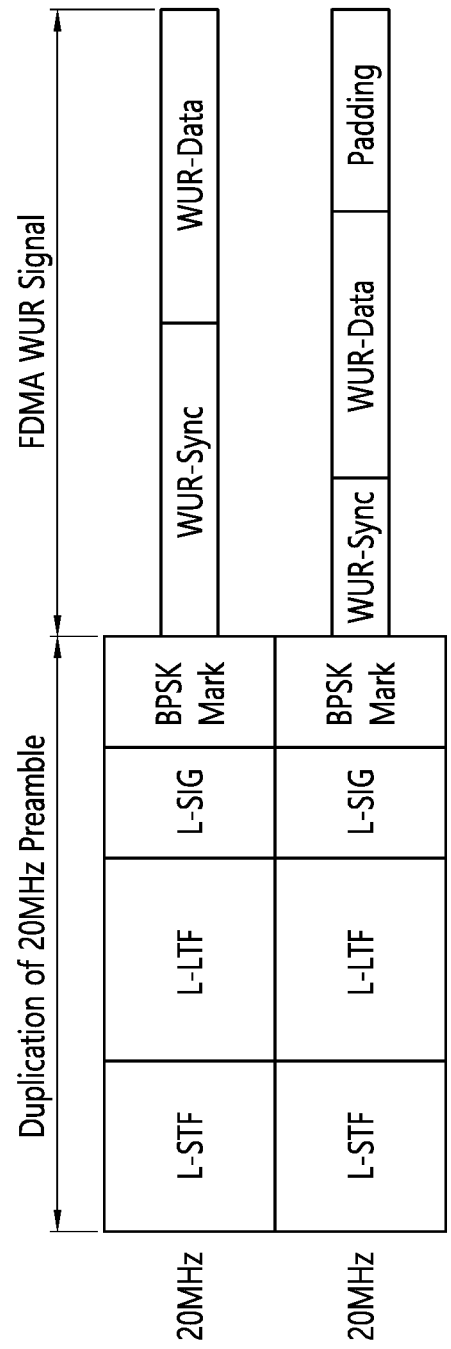
FIG. 8 is a diagram illustrating a frequency-division-multiplexing-access (FDMA) based WUR PPDU having a 40 MHz channel bandwidth.

FIG. 8 is a diagram illustrating a frequency-division-multiplexing-access (FDMA) based WUR PPDU having a 40 MHz channel bandwidth.

Referring to FIG. 8, a 40 MHz preamble may be acquired by duplicating a 20 MHz preamble including L-STF, L-FTF, L-SIG and BPSK-mark fields.

For the FDMA based WUR PPDU having a 40 MHz channel bandwidth, different Sync fields may be applied to 20 MHz channels according to a data rate of the WUR-data field.

Referring to FIG. 8, in each 20 MHz subchannel having a duplicated 20 MHz preamble, a single 4 MHz WUR signal located at the center of the 20 MHz subchannel can be transmitted following the 20 MHz preamble.

In FDMA transmission, WUR PPDU transmission over respective 20 MHz subchannels may be configured to have the same transmission duration using a padding field.

Although FIG. 8 illustrates the FDMA based WUR PPDU having a 40 MHz channel bandwidth, the present specification is not limited thereto. That is, the FDMA based WUR PPDU may be configured to have an 80 MHz channel bandwidth.

Figure 9:
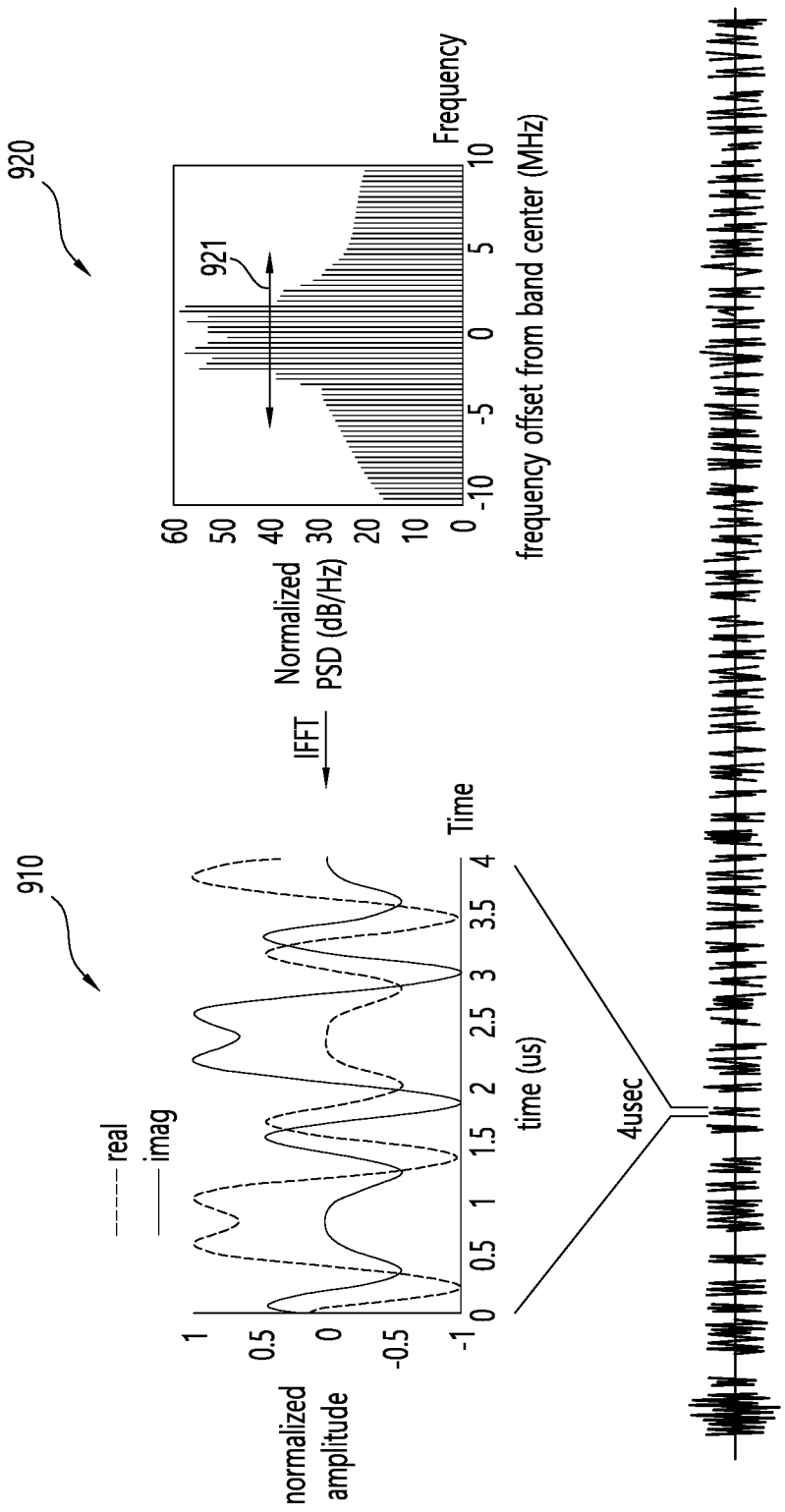
FIG. 9 is a diagram illustrating a design process of a pulse according to OOK.

FIG. 9 is a diagram illustrating a design process of a pulse according to OOK.

A wireless terminal according to the present embodiment may use an existing orthogonal frequency-division multiplexing (OFDM) transmitter of 802.11 in order to generate pulses according to OOK. The existing 802.11 OFDM transmitter may generate a 64-bit sequence by applying 64-point IFFT.

Referring to FIG. 1 to FIG. 9, the wireless terminal according to the present embodiment may transmit a payload of a modulated wake-up packet (WUP) according to OOK. The payload (e.g., 620 of FIG. 6) according to the present embodiment may be implemented based on an ON-signal and an OFF-signal.

The OOK may be applied for the ON-signal included in the payload (e.g., 620 of FIG. 6) of the WUP. In this case, the ON-signal may be a signal having an actual power value.

With reference to a frequency domain graph 920, an ON-signal included in the payload (e.g., 620 of FIG. 6) may be obtained by performing IFFT for the N2 number of subcarriers (N2 is a natural number) among the N1 number of subcarriers (N1 is a natural number) corresponding to a channel band of the WUP. Further, a predetermined sequence may be applied to the N2 number of subcarriers.

For example, a channel band of the wakeup packet WUP may be 20 MHz. The N1 number of subcarriers may be 64 subcarriers, and the N2 number of subcarriers may be 13 consecutive subcarriers (921 in FIG. 9). A subcarrier interval applied to the wakeup packet WUP may be 312.5 kHz.

The OOK may be applied for an OFF-signal included in the payload (e.g., 620 of FIG. 6) of the WUP. The OFF-signal may be a signal that does not have an actual power value. That is, the OFF-signal may not be considered in a configuration of the WUP.

The ON-signal included in the payload (620 of FIG. 6) of the WUP may be determined (i.e., demodulated) to a 1-bit ON-signal (i.e., '1') by the WUR module (e.g., 512 of FIG. 5). Similarly, the OFF-signal included in the payload may be determined (i.e., demodulated) to a 1-bit OFF-signal (i.e., '0') by the WUR module (e.g., 512 of FIG. 5).

A specific sequence may be preset for a subcarrier set 921 of FIG. 9. In this case, the preset sequence may be a 13-bit sequence. For example, a coefficient corresponding to the DC subcarrier in the 13-bit sequence may be '0', and the remaining coefficients may be set to '1' or '−1'.

With reference to the frequency domain graph 920, the subcarrier set 921 may correspond to a subcarrier whose subcarrier indices are '−6' to '+6'.

For example, a coefficient corresponding to a subcarrier whose subcarrier indices are '−6' to '−1' in the 13-bit sequence may be set to '1' or '−1'. A coefficient corresponding to a subcarrier whose subcarrier indices are '1' to '6' in the 13-bit sequence may be set to '1' or '−1'.

For example, a subcarrier whose subcarrier index is '0' in the 13-bit sequence may be nulled. All coefficients of the remaining subcarriers (subcarrier indexes '−32' to '−7' and subcarrier indexes '+7' to '+31'), except for the subcarrier set 921 may be set to '0'.

The subcarrier set 921 corresponding to consecutive 13 subcarriers may be set to have a channel bandwidth of about 4.06 MHz. That is, power by signals may be concentrated at 4.06 MHz in the 20 MHz band for the wake-up packet (WUP).

According to the present embodiment, when a pulse according to the OOK is used, power is concentrated in a specific band and thus there is an advantage that a signal to noise ratio (SNR) may increase, and in an AC/DC converter of the receiver, there is an advantage that power consumption for conversion may be reduced. Because a sampling frequency band is reduced to 4.06 MHz, power consumption by the wireless terminal may be reduced.

An OFDM transmitter of 802.11 according to the present embodiment may have may perform IFFT (e.g., 64-point IFFT) for the N2 number (e.g., consecutive 13) of subcarriers of the N1 number (e.g., 64) of subcarriers corresponding to a channel band (e.g., 20 MHz band) of a wake-up packet.

In this case, a predetermined sequence may be applied to the N2 number of subcarriers. Accordingly, one ON-signal may be generated in a time domain. One bit information corresponding to one ON-signal may be transferred through one symbol.

For example, when a 64-point IFFT is performed, a symbol having a length of 3.2 us corresponding to a subcarrier set 921 may be generated. Further, when a cyclic prefix (CP, 0.8 us) is added to a symbol having a length of 3.2 us corresponding to the subcarrier set 921, one symbol having a total length of 4 us may be generated, as in the time domain graph 910 of FIG. 9.

Further, the OFDM transmitter of 802.11 may not transmit an OFF-signal.

According to the present embodiment, a first wireless terminal (e.g., 510 of FIG. 5) including a WUR module (e.g., 512 of FIG. 5) may demodulate a receiving packet based on an envelope detector that extracts an envelope of a received signal.

For example, the WUR module (e.g., 512 of FIG. 5) according to the present embodiment may compare a power level of a received signal obtained through an envelope of the received signal with a predetermined threshold level.

If a power level of the received signal is higher than a threshold level, the WUR module (e.g., 512 of FIG. 5) may determine the received signal to a 1-bit ON-signal (i.e., '1'). If a power level of the received signal is lower than a threshold level, the WUR module (e.g., 512 of FIG. 5) may determine the received signal to a 1-bit OFF-signal (i.e., '0').

Generalizing contents of FIG. 9, each signal having a length of K (e.g., K is a natural number) in the 20 MHz band may be transmitted based on consecutive K subcarriers of 64 subcarriers for the 20 MHz band. For example, K may correspond to the number of subcarriers used for transmitting a signal. Further, K may correspond to a bandwidth of a pulse according to the OOK.

All coefficients of the remaining subcarriers, except for K subcarriers among 64 subcarriers may be set to '0'.

Specifically, for a one bit OFF-signal corresponding to '0' (hereinafter, information 0) and a one bit ON-signal corresponding to '1' (hereinafter, information 1), the same K subcarriers may be used. For example, the used index for the K subcarriers may be expressed as 33-floor (K/2): 33+ceil (K/2)−1.

In this case, the information 1 and the information 0 may have the following values.

Information 0=zeros (1, K)
Information 1=alpha*ones (1, K)

The alpha is a power normalization factor and may be, for example, 1/sqrt (K).

Figure 10:
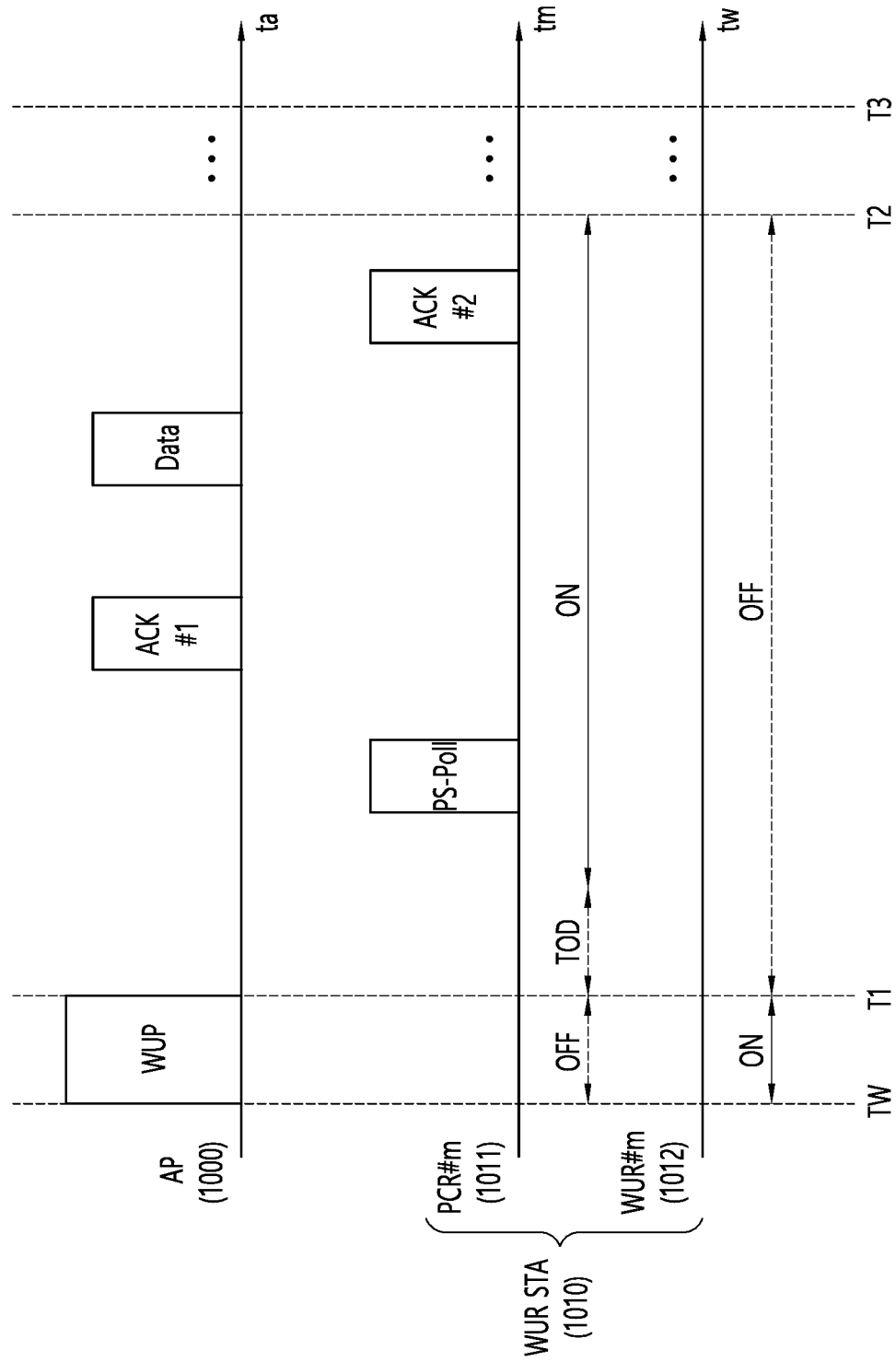
FIG. 10 illustrates a basic operation for a WUR STA.

FIG. 10 illustrates a basic operation for a WUR STA.

Referring to FIG. 10, an AP 1000 may correspond to the second wireless terminal 520 of FIG. 5. A horizontal axis of the AP 1000 of FIG. 10 may indicate a time ta. A vertical axis of the AP 1000 of FIG. 10 may be related to presence of a packet (or frame) to be transmitted by the AP 1000.

A WUR STA 1010 may correspond to the first wireless terminal 510 of FIG. 5. The WUR STA 1010 may include a main radio module (or PCR #m) 1011 and a WUR module (or WUR #m) 1012. The main radio module 1011 of FIG. 10 may correspond to the main radio module 511 of FIG. 5.

Specifically, the main radio module 1011 may support both a reception operation for receiving an 802.11-based packet from the AP 1000 and a transmission operation for transmitting the 802.11-based packet to the AP 1000. For example, the 802.11-based packet may be a packet modulated according to an OFDM scheme.

A horizontal axis of the main radio module 1011 may indicate a time tm. An arrow displayed at the lower end of the horizontal axis of the main radio module 1011 may be related to a power state (e.g., ON state or OFF state) of the main radio module 1011.

The WUR module 1012 in FIG. 10 may correspond to the WUR module 512 in FIG. 5. Specifically, the WUR module 1012 can support only an operation of receiving packets modulated with on-off keying (OOK) from the AP 1000.

A horizontal axis of the WUR module 1012 may indicate a time tw. An arrow indicated at the lower end of the horizontal axis of the WUR module 1012 may be related to a power state (e.g., ON state or OFF state) of the WUR module 1012.

The WUR STA 1010 in FIG. 10 may be understood as a wireless terminal associated with the AP 1000 through an association procedure.

The WUR STA 1010 in FIG. 10 may be understood as a wireless terminal operating in the PS mode. Accordingly, the WUR STA 1010 can control the main radio module 1011 such that it is in a doze state or an awake state.

Further, the WUR STA 1010 may be understood as a wireless terminal operating in the WUR mode. Accordingly, the WUR STA 1010 can control the WUR module 1012 such that it is in a turn-off state or a turn-on state.

Referring to FIG. 5 and FIG. 10, the AP 1000 of FIG. 10 may correspond to the second wireless terminal 520 of FIG. 5. A horizontal axis of the AP 1000 of FIG. 10 may represent a time ta. A vertical axis of the AP 1000 of FIG. 10 may be related to presence of a packet (or frame) to be transmitted by the AP 1000.

The WUR STA 1010 may correspond to the first wireless terminal 510 of FIG. 5. The WUR STA 1010 may include a main radio module (or PCR #m) 1011 and a WUR module (or WUR #m) 1012. The main radio module 1011 of FIG. 10 may correspond to the main radio module 511 of FIG. 5.

Specifically, the main radio module 1011 may support both a reception operation for receiving an 802.11-based packet from the AP 1000 and a transmission operation for transmitting an 802.11-based packet to the AP 1000. For example, the 802.11-based packet may be a packet modulated according to the OFDM scheme.

A horizontal axis of the main radio module 1011 may represent a time tm. An arrow displayed at the lower end of the horizontal axis of the main radio module 1011 may be related to a power state (e.g., ON state or OFF state) of the main radio module 1011.

A vertical axis of the main radio module 1011 may be related to presence of a packet to be transmitted based on the main radio module 1011. A WUR module 1012 of FIG. 10 may correspond to the WUR module 512 of FIG. 5. Specifically, the WUR module 1012 may support only a reception operation for a packet modulated from the AP 1000 according to OOK.

A horizontal axis of the WUR module 1012 may represent a time tw. Further, an arrow displayed at the lower end of the horizontal axis of the WUR module 1012 may be related to a power state (e.g., ON state or OFF state) of the WUR module 1012.

In a wake-up period TW to T1 in FIG. 10, the WUR STA 1010 can control the main radio module 1011 such that it is in a doze state (i.e., OFF state). Further, the WUR STA 1010 can control the WUR module 1012 such that it is in a turn-on state (i.e., ON state).

When a data packet for the WUR STA 1010 exists in the AP 1000, the AP 1000 may transmit a wake-up packet (WUP) to the WUR STA 1010 in a contention-based manner.

In this case, the WUR STA 1010 may receive the WUP based on the WUR module 1012 in a turn-on state (i.e., ON state). Herein, the WUP may be understood based on the description mentioned above with reference to FIG. 5 to FIG. 7.

In a first duration T1 to T2 of FIG. 10, a wake-up signal (e.g., 523 of FIG. 5) for waking up the main radio module 511 according to the WUP received in the WUR module 1012 may be transferred to the main radio module 511.

In the present specification, a time required when the main radio module 511 transitions from a doze state to an awake state according to the wake-up signal (e.g., 523 of FIG. 5) may be referred to as a turn-on delay (hereinafter, TOD).

Referring to FIG. 10, the main radio module 511 may be in an awake state after a lapse of the turn-on delay (TOD).

For example, upon elapse of the TOD, the WUR STA 1010 may control the main radio module 1010 to be in the awake state (e.g., ON state). For example, upon elapse of a wake-up duration TW to T1, the WUR STA 1010 may control the WUR module 1012 to be in the turn-on state (i.e., OFF state).

Subsequently, the WUR STA 1010 may transmit a power save poll (hereinafter, PS-poll) to the AP 1000 based on the main radio module 1011 in the awake state (i.e., ON state).

Here, a PS-poll frame may be a frame for indicating that the WUR STA 1010 can receive a data packet for the WUR STA 1010 present within the AP 1000 based on the main radio module 1011. Further, the PS-poll frame may be a frame transmitted based on contention with another wireless terminal (not shown).

Subsequently, the AP 1000 may transmit a first ACK frame ACK #1 to the WUR STA 1010 in response to a PS-poll frame.

Subsequently, the AP 1000 may transmit a data packet for the WUR STA 1010 to the WUR STA 1010. In this case, the data packet for the WUR STA 1010 may be received based on the main radio module 1011 in an awake state (i.e., ON state).

Subsequently, the WUR STA 1010 may transmit a second ACK frame ACK #2 for notification of successful reception of the data packet for the WUR STA 1010 to the AP 1000.

Figure 11:
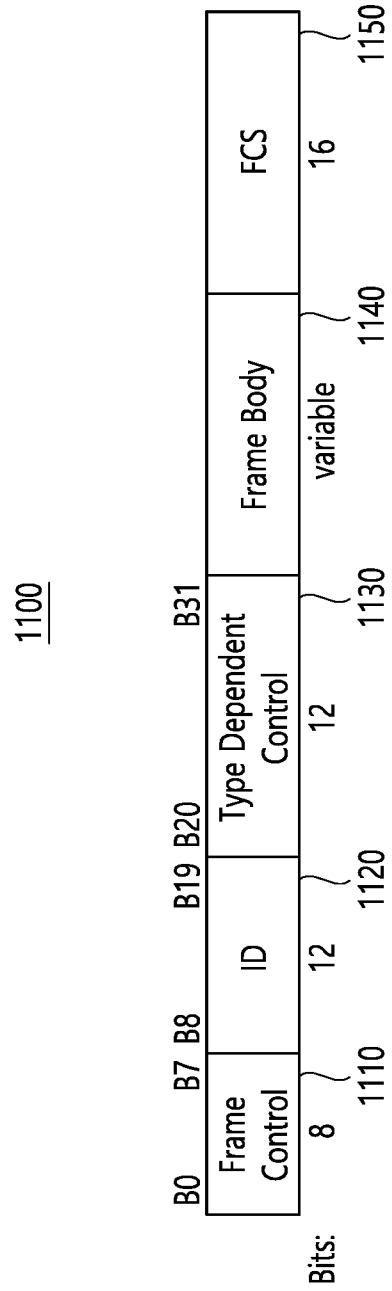
FIG. 11 is a diagram illustrating a MAC frame structure for a WUR frame according to an embodiment.

FIG. 11 is a diagram illustrating a MAC frame structure for a WUR frame according to an embodiment.

Referring to FIGS. 1 to 11, a WUR-data field (e.g., 620 of FIG. 6) included in a WUR PPDU according to an embodiment may conform to a MAC frame structure 1100 of FIG. 11.

The MAC frame structure 1100 for the WUR frame may include a plurality of fields 1110 to 1150.

The frame control field 1110 is configured based on 8-bit information B0-B7 and will be described in more detail later with reference to FIG. 12.

The ID field 1120 may be configured based on 12-bit information B8-B19. For example, when a wake-up packet is individually addressed, identification information fields (WUR identifier, 'WUR ID' hereinafter) for a single wireless terminal that receives a unicast wake-up packet can be set to the ID field 1120.

Specifically, a WUR ID included in a unicast wake-up packet can be used to identify a WUR STA intended for immediate response.

Alternatively, when a wake-up packet is group addressed, a group ID (hereinafter GID) for a plurality of wireless terminals receiving a multicast wake-up packet can be set to the ID field 1120.

Further, when a wake-up packet is broadcast addressed, an identification information field (transmitter ID, hereinafter TXID) of a wireless terminal transmitting a broadcast wake-up packet can be set to the ID field 1120.

Alternatively, '0' may be set to the ID field 1120 in order to signal inclusion of a plurality of WUR IDs in a frame body field (i.e., 1140 of FIG. 11) of a wake-up packet.

The type dependent control field 1130 may be represented by 12-bit information B20-B31. For example, the type dependent control field 1130 may include information related to BSS update.

The frame body field 1140 may have a variable length. The frame body field 1140 may include WUR IDs for a plurality of wireless terminals.

For example, a WUR frame having a fixed length may not include the frame body field 1140. Alternatively, a WUR frame having a variable length may include the frame body field 1140.

In the present specification, a WUR frame having a fixed length may be referred to as a fixed-length (FL) WUR frame. For example, the FL WUR frame may not include the frame body field.

A WUR frame having a variable length may be referred to as a variable-length (VL) WUR frame. For example, the VL WUR frame may include a variable-length frame body field.

The frame check sequence (FCS) field 1150 may include 16-bit CRC information.

FIG. 12 is a diagram illustrating a structure of a frame control field of a WUR frame according to an embodiment.

Referring to FIG. 12, the frame control field 1200 (e.g., 1110 of FIG. 11) of the WUR frame according to an embodiment may include a plurality of fields 1210 to 1250.

The type field 1210 may include 3-bit information as shown in Table 3 below.

TABLE 3

| Type | Type description |
| --- | --- |
| 0 | WUR Beacon |
| 1 | WUR Wake-up |
| 2 | WUR Vendor Specific |
| 3 | WUR discovery |
| 4-7 | Reserved |

For example, referring to Table 3, when a WUR frame type is a WUR beacon frame, the WUR beacon frame can be understood as an FL WUR frame that does not include the frame body field (e.g., 1140 of FIG. 11).

For example, a WUR wake-up frame (i.e., wake-up packet) including a single WUR ID, a WUR wake-up frame (i.e., wake-up packet) including a single GID, and a WUR wake-up frame (i.e., wake-up packet) including a TXID can be understood as FL WUR frames including no frame body field (e.g., 1140 of FIG. 11).

However, a WUR wake-up frame (i.e., wake-up packet) including a plurality of WUR IDs can be understood as a VL WUR frame including the frame body field (e.g., 1140 of FIG. 11).

The VL WUR frame includes information related to the length of the frame body field (e.g., 1140 of FIG. 11), whereas the FL WUR frame does not include information related to the length of the frame body field (e.g., 1140 of FIG. 11).

According to conventional technology, the type field 1210 is allocated only one value for a WUR wake-up frame (i.e., wake-up packet), and information for differentiating the VL WUR frame from the FL WUR frame is not additionally included in the frame control field 1200 of the WUR frame.

Hereinafter, the present specification discloses a method for signaling information for differentiating the VL WUR frame from the FL WUR frame using some bits of the frame control field of the WUR frame.

According to an embodiment, the length present field 1220 may include information related to whether the subsequent field 1230 includes a length subfield for a VL WUR frame. For example, the length present field 1220 may be configured to have a 1-bit length.

The length/mist field 1230 may include a length subfield based on the length present field 1220.

For example, when the length present field 1220 is set to a first value for a VL WUR frame, the length/mist field 1230 may include information related to the length of the frame body field (e.g., 1140 of FIG. 11).

Alternatively, when the length present field 1220 is set to a second value for an FL WUR frame, the length/mist field 1230 may be reserved. Alternatively, when the length present field 1220 is set to the second value, the length/mist field 1230 may include other information.

The protected field 1240 may include information for indicating whether information transmitted through the wake-up packet is processed by a message integrity check (MIC) algorithm.

The positions of the plurality of fields illustrated in FIG. 12 are exemplary and the present specification is not limited thereto. For example, the position of the length present field 1220 may be interchanged with the position of the protected field 1240.

Figure 13:
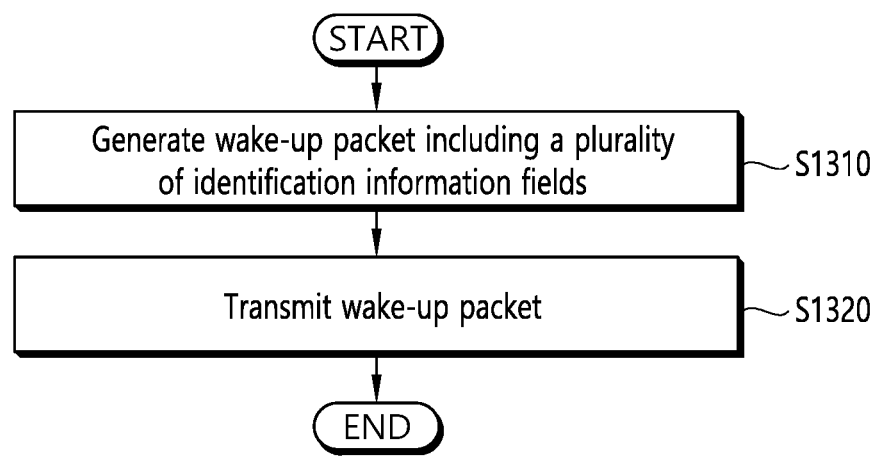
FIG. 13 is a flowchart illustrating a method for communicating in a wireless LAN system according to an exemplary embodiment from an AP perspective.

FIG. 13 is a flowchart illustrating a method for communicating in a wireless LAN system according to an exemplary embodiment from an AP perspective.

Referring to FIGS. 1 to 13, a first wireless terminal of FIG. 13 may be understood as an access point (AP) and that a plurality of second wireless terminals of FIG. 13 may be understood as some (or all) of a plurality of stations (STAs) associated with the first wireless terminal which is the first wireless terminal.

In addition, each of the plurality of second radio terminals mentioned in FIG. 13 (e.g., 510 in FIG. 5) may include a primary connectivity radio (PCR) module (e.g., 511 in FIG. 5) and a Wake-Up Radio (WUR) module (e.g., 512 of FIG. 5) for receiving a wake-up packet modulated by an OOK technique.

In addition, each of the plurality of second wireless terminals referred to in FIG. 13 (e.g., 510 of FIG. 5) may control its own WUR module to be in a turn-on state in order to receive a wake-up packet which is to be received from the first wireless terminal.

In operation S1310, the first wireless terminal may generate a wake-up packet modulated by an On-Off Keying (OOK) technique.

For example, the wake-up packet may include a plurality of identification information fields for the plurality of second wireless terminals.

For example, each of the plurality of identification information fields may be generated based on a bit length unit having a fixed size. In this case, the bit length unit having the fixed size may be set to 12 bits.

Specifically, a plurality of unicast identification information fields (e.g., WUR IDs) for individually identifying the plurality of second wireless terminals may be a frame body field (e.g., 1140 of FIG. 11) in a wake-up packet.

In operation S1320, the first wireless terminal may transmit the wake-up packet to the plurality of second wireless terminals.

For example, the PCR module (e.g., 511 of FIG. 5) included in each of the plurality of second radio terminals (e.g., 510 of FIG. 5) may be controlled to remain in an awake state in order to perform 20 MHz band-based communication with the first wireless terminal (e.g., 520 of FIG. 5) according to a plurality of identification information fields.

Figure 14:
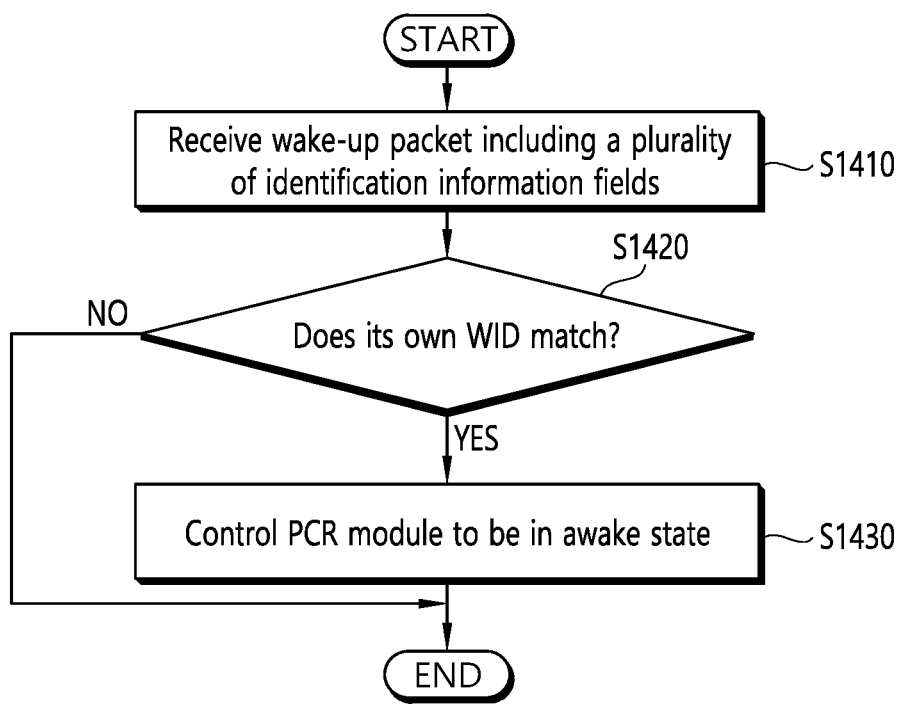
FIG. 14 is a flowchart illustrating a method for communicating in a WLAN system according to an exemplary embodiment from a STA perspective.

FIG. 14 is a flowchart illustrating a method for communicating in a WLAN system according to an exemplary embodiment from a STA perspective.

referring to FIGS. 1 to 14, a first wireless terminal of FIG. 14 may be understood as an access point (AP) and that a plurality of second wireless terminals may be understood as some (or all) of a plurality of stations (STAs) associated with the first wireless terminal which is the AP. In addition, a communication terminal mentioned in FIG. 14 may be understood as any one of a plurality of STAs combined with a first wireless terminal that is an AP.

In addition, each of the plurality of second wireless terminals mentioned in FIG. 14 (e.g., 510 of FIG. 5) may receive a primary connectivity radio (PCR) module (e.g., 511 of FIG. 5) and a Wake-Up Radio (WUR) module (e.g., 512 of FIG. 5) for receiving a wake-up packet modulated by an OOK technique.

In addition, each of the plurality of second wireless terminals mentioned in FIG. 14 (e.g., 510 of FIG. 5) may control its own WUR module (e.g., 512 of FIG. 5) to be in a turn-on state in order to receive a wake-up packet which is to be received from the first wireless terminal (e.g., 520 of FIG. 5).

In addition, the communication terminal referred to in FIG. 14 (e.g., 510 of FIG. 5) may include the PCR module (e.g., 511 of FIG. 5) and the WUR module (e.g., 512 of FIG. 5) for receiving a wake-up packet modulated by the OOK technique.

In operation S1410, the communication terminal may receive a wake-up packet modulated by an On-Off keying (OOK) technique from the first wireless terminal.

For example, the wake-up packet may include a plurality of identification information fields for the plurality of second wireless terminals.

For example, each of the plurality of identification information fields may be generated based on a bit length unit having a fixed size. In this case, the bit length unit having the fixed size may be set to 12 bits.

Specifically, a plurality of unicast identification information fields (e.g., WUR IDs) for individually identifying the plurality of second wireless terminals may be included in a frame body field (e.g., 1140 of FIG. 11) in the wake-up packet.

For example, the communication terminal of FIG. 14 (e.g., 510 of FIG. 5) may receive a plurality of identification information fields included in the wake-up packet based on its own WUR module (e.g., 512 of FIG. 5) in the turn-on state.

In operation S1420, the communication terminal may determine, based on a bit length unit, whether or not its own preset identification information field (that is, WUR ID) is included in the plurality of identification information fields (e.g., WUR IDs) acquired from the wake-up packet.

For example, if a frame body field (e.g., 1140 of FIG. 11) is included in the received wakeup packet, the communication terminal in FIG. 14 may scan the plurality of identification information fields (e.g., WUR IDs) based on a bit length unit having a fixed size.

In other words, the communication terminal of FIG. 14 may determine, based on a bit length unit having a fixed size, whether information matching its own identification information field (that is, WUR ID) is included in a plurality of identification information fields (e.g., WUR IDs).

If it is determined that its own preset identification information field is not included in the plurality of identification information fields, the procedure is terminated. In this case, for a power saving operation, the communication terminal may control the PCR module to maintain a doze state while maintaining only its own WUR module in the turn-on state.

If it is determined that its own preset identification information field is included in the plurality of identification information fields, the operation S1430 may be performed.

In operation S1430, the communication terminal may control its own PCR module to be in an awake state in order to perform 20 MHz band-based communication with the first wireless terminal which is the AP.

According to this embodiment, since whether or not its own identification information field is included in a wake-up packet is determined based on a bit length unit having a fixed size, complexity of implementing a low-power communication terminal including a WUR module may be relatively reduced.

FIGS. 15 to 21 illustrate a format structure of a VL WUR frame including a plurality of identification information fields configured based on a bit length unit having a variable length.

Figure 15:
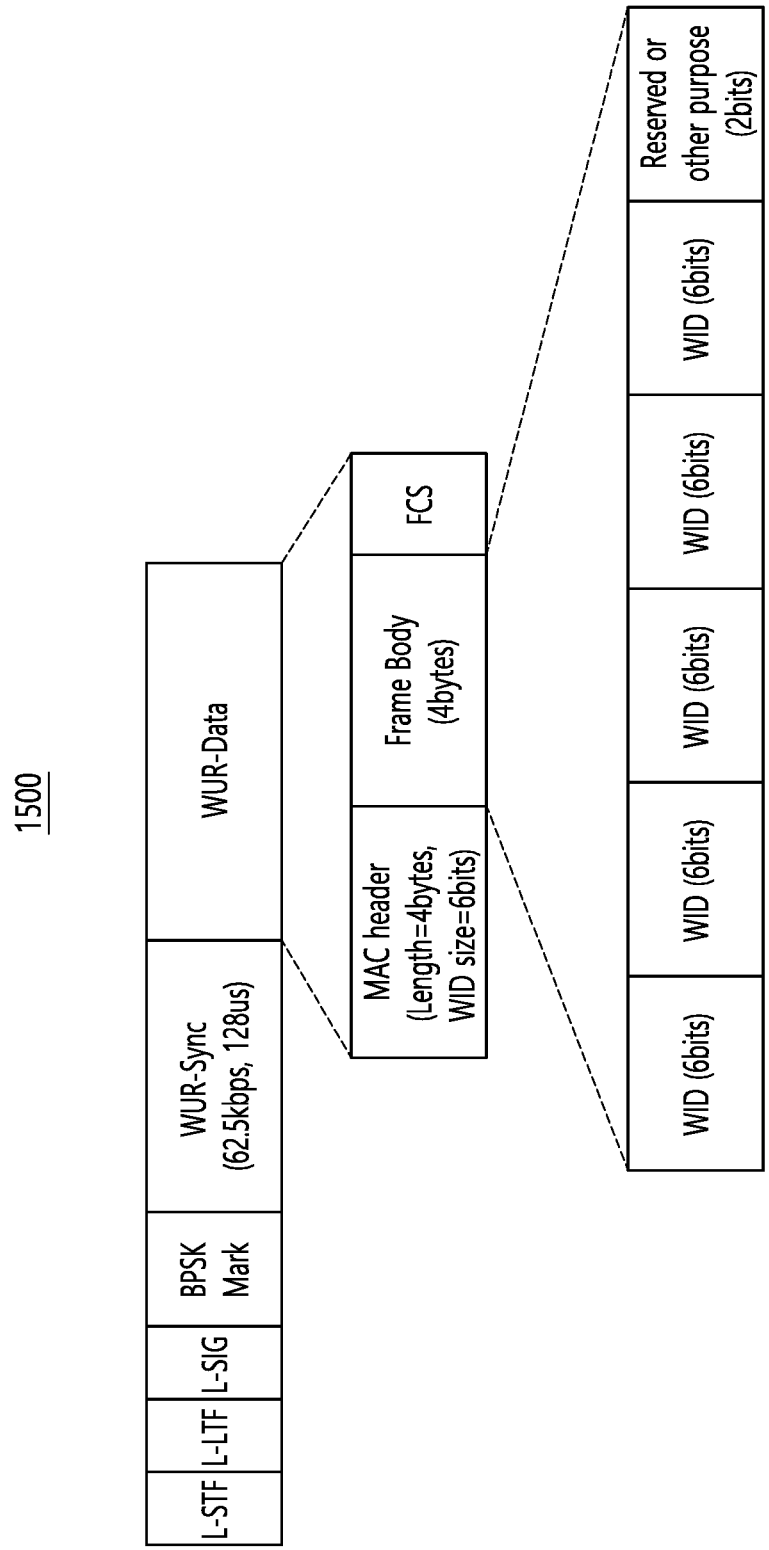
FIGS. 15 to 21 illustrate a format structure of a VL WUR frame including a plurality of identification information fields configured based on a bit length unit having a variable length.

Referring to FIG. 15, information on a size (e.g., 6 bits) of identification information field (e.g., WUR ID which is hereinafter referred to as "WID") for a wireless terminal addressed by a wake-up frame may be included in an MAC header of a VL WUR frame 1500.

For example, five identification information fields (e.g., WIDs) each having a size of 6 bits may be included in a frame body field implemented with 4 bytes. In this case, the remaining 2 bits of the frame body field may be reserved or used for other purposes.

Figure 16:
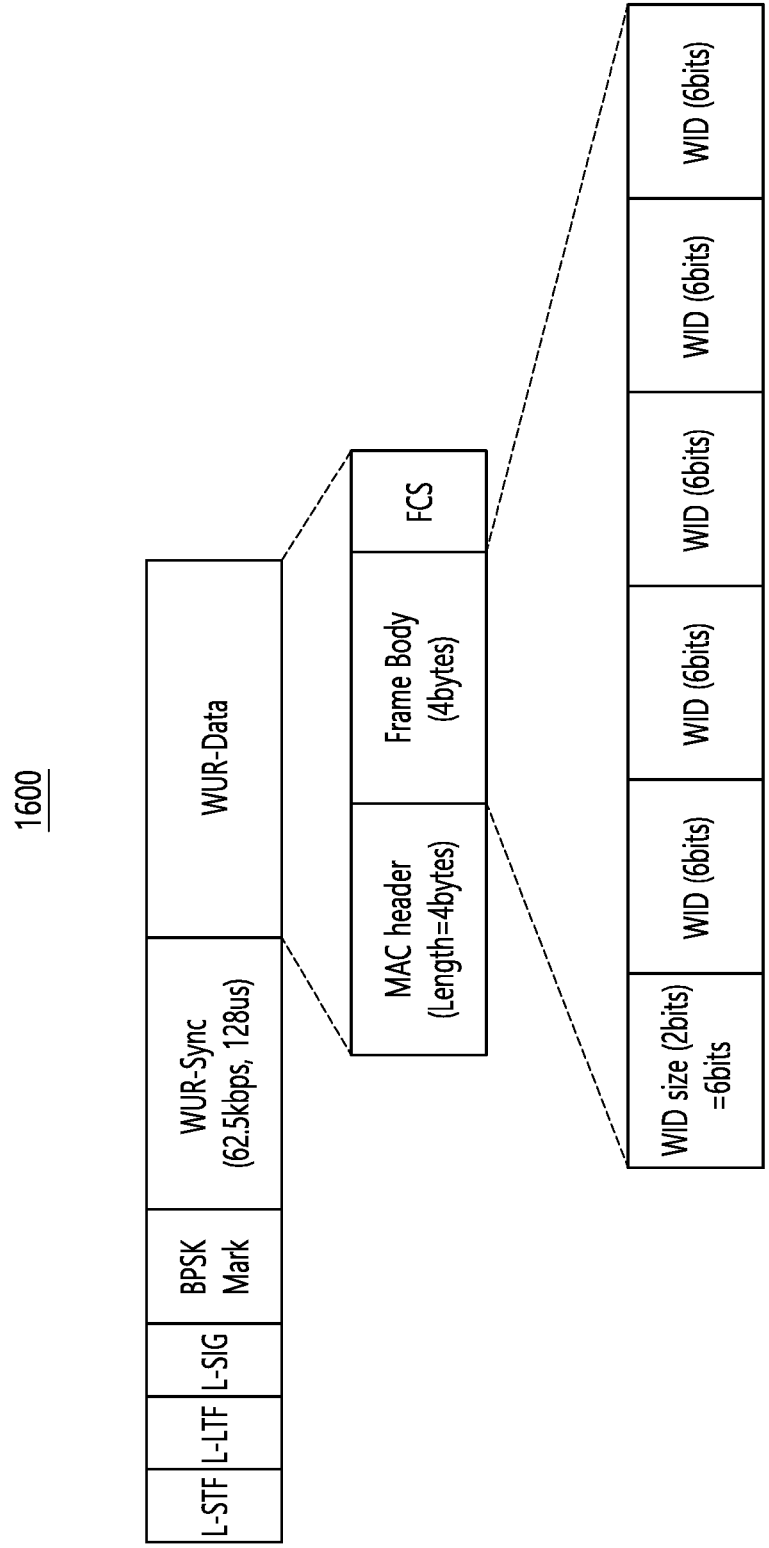

Referring to FIG. 16, information on a length of a frame body field may be included in an MAC header of a VL WUR frame 1600. In this case, information on a size (WID size, 2 bits) of identification information field (that is, WID) for a wireless terminal may be included at the front of the frame body field.

For example, when a 2 bits-based WID size indicates "6", five identification information fields (e.g., WIDs) each having a size of 6 bits may be included in the frame body field of the VL WUR frame 1600.

Figure 17:
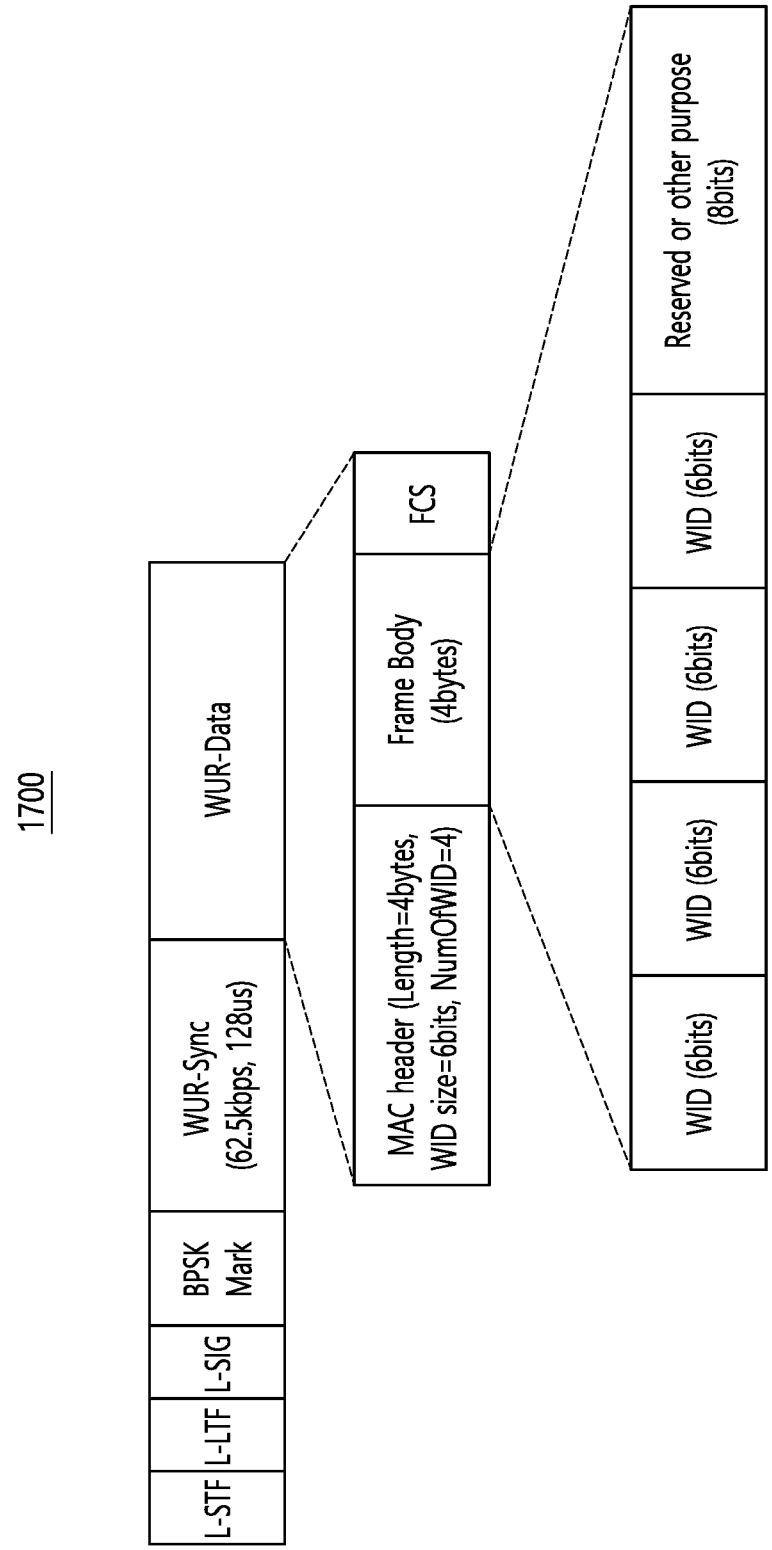

Referring to FIG. 17, information on a length of a frame body field, information on a size (e.g., WID size) of identification information field (e.g., WID) for a wireless terminal, and information (e.g., NumOfWID) on a number of identification information field (e.g., WID) included in the frame body field may be included in an MAC header of a VL WUR frame 1700.

For example, according to information (e.g., WID size, NumOfWID) included in the MAC header, four identification information fields (e.g., WID) each having a size of 6 bits may be included in the frame body field of the VL WUR frame 1700. The remaining 8 bits of the frame body field in FIG. 17 may be used for other purposes.

Figure 18:
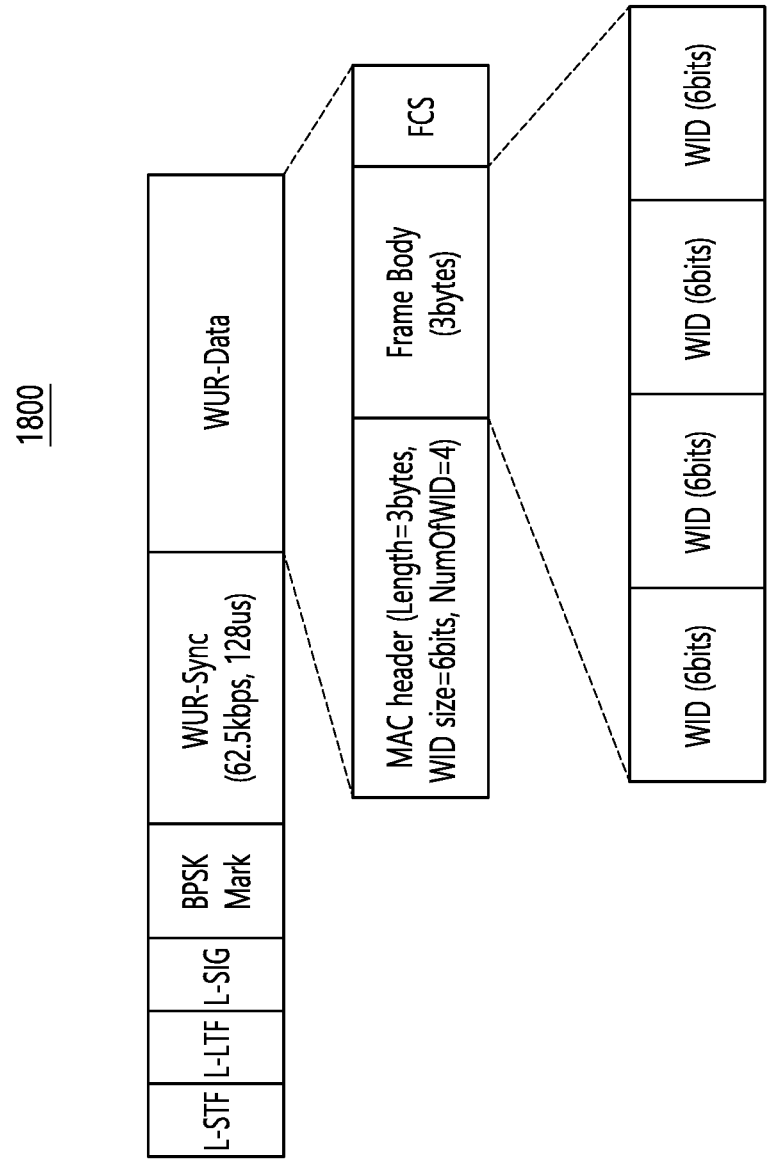

Referring to FIG. 18, FIG. 18 may be understood as a case where the remaining 8 bits of the frame body field of FIG. 17 are not used for other purposes.

For example, according to information (WID size, NumOfWID) included in an MAC header of a VL WUR frame 1800, four identification information fields (e.g., WID) each having a size of 6 bits may be included in a frame body field of a VL WUR frame 1800.

Figure 19:
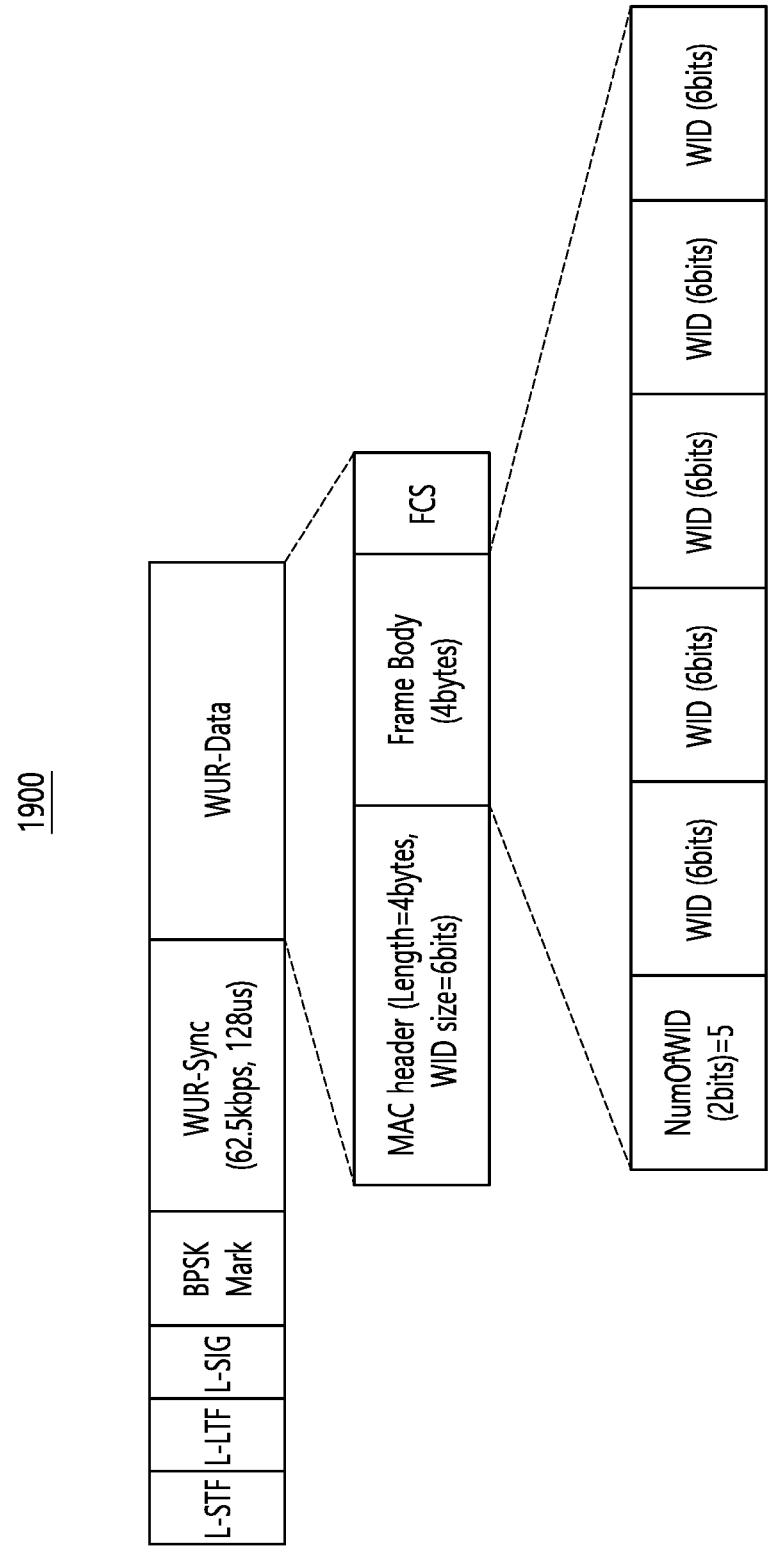

Referring to FIG. 19, information on a length of a frame body field and information (e.g., WID size) on a size of identification information field (e.g., WID) for a wireless terminal may be included in the MAC header of the VL WUR frame 1800.

Information (e.g., NumOfWID) on a number of identification information field (that is, WID) included in a frame body field implemented with 2 bits may be included at the front of the frame body field of the VL WUR frame 1800.

For example, according to information (that is, WID size) included in an MAC header of a VL WUR frame 1900 and information (e.g., NumOfWID) included in the frame body field, five identification information fields (that is, WID) each having a size of 6 bits may be included in the frame body field of the VL WUR frame 1900.

Figure 20:
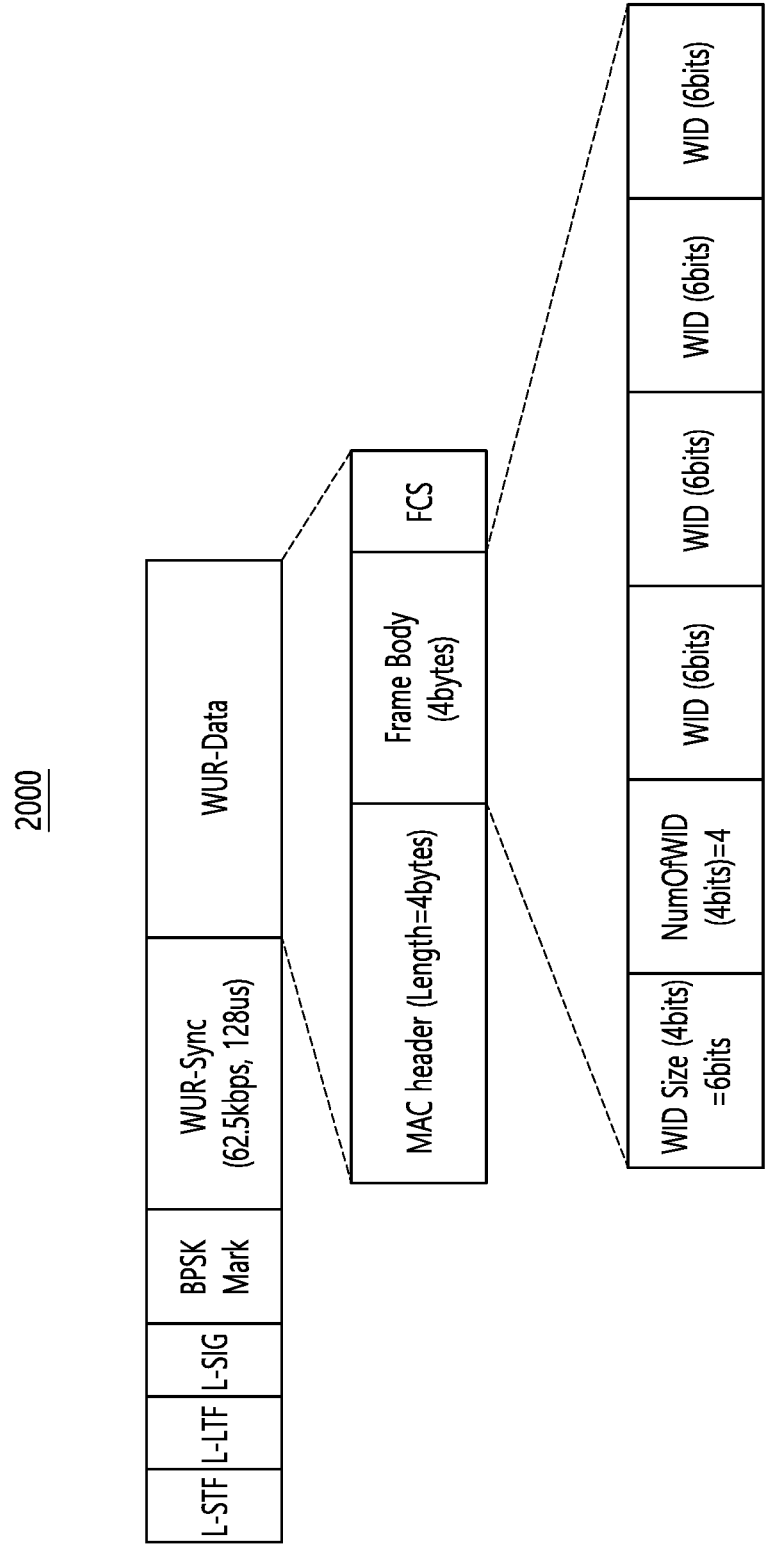

Referring to FIG. 20, information on a length of a frame body field may be included in an MAC header of a VL WUR frame 2000.

In addition, information (that is, WID size) on a size of identification information field (that is, WID) for a wireless terminal and information (that is, NumOfWID) on a number of identification information fields (that is, WID) included in the frame body field may be included in the frame body field of the VL WUR frame 2000.

For example, according to information included in the MAC header of the VL WUR frame 1900 and information included in the frame body field (that is, WID size, NumOfWID), four identification information fields (that is, WID) each having a size of 6 bits may be included in the frame body field of the VL WUR frame 1900.

Figure 21:
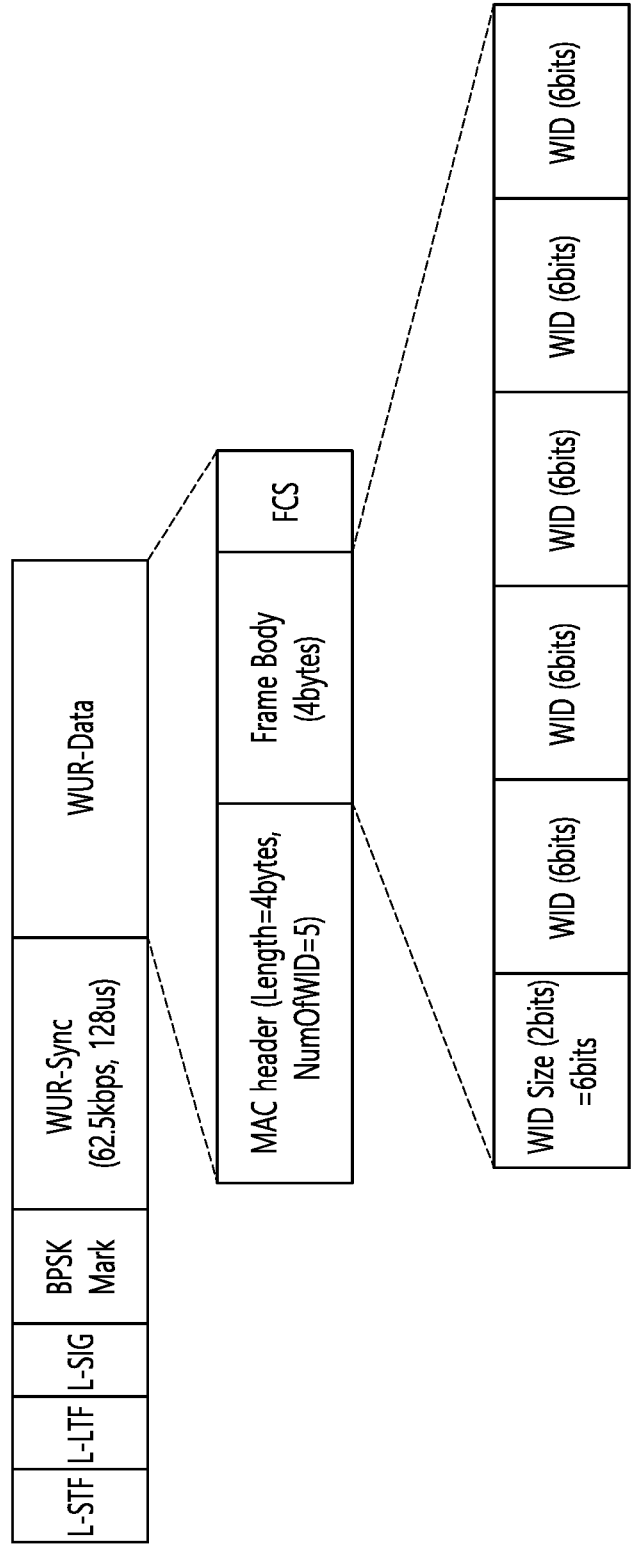

Referring to FIG. 21, information on a length of a frame body field and information (e.g., NumOfWID) on a number of identification information field (e.g., WID) included in the frame body field may be included in an MAC header of a VL WUR frame 2100.

In addition, information (e.g., WID size) on a size of identification information field (e.g., WID) for a wireless terminal may be included in the frame body field of the VL WUR frame 2100.

For example, according to information (e.g., NumOfWID) included in the MAC header of the VL WUR frame 2100 and information (e.g., WID size) included in the frame body field, four identification information fields (e.g., WID) each having a size of 6 bits may be included in the frame body field of the VL WUR frame 2100.

Figure 22:
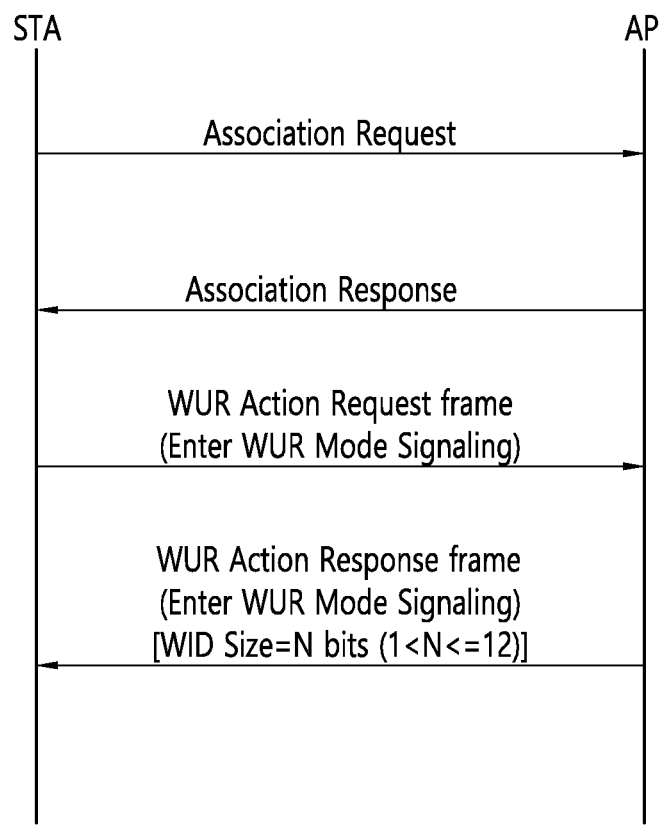
FIG. 22 is a diagram of a method of determining information on a size of identification information fields for a wireless terminal according to another embodiment.

FIG. 22 is a diagram of a method of determining information on a size of identification information field for a wireless terminal according to another embodiment.

Referring to FIG. 22, a size of identification information field for a wireless terminal may be signaled in advance to an STA during frame transmission and reception (e.g., WUR parameter negotiation exchange procedure) with respect to an AP based on a PCR module for 20 MHz band of the STA.

Specifically, the WUR parameter negotiation exchange procedure is understood as a concept including exchange of Enter WUR Mode Signaling Request/Response frame, exchange of Enter WUR Mode Suspend Request/Response frame, exchange of WUR Action frame, or exchange of Association Request/Response frame.

For example, the STA in a WUR mode may, when receiving a WUR frame, may determine a size (e.g., WID Size) of identification information field included in the frame body field included in the WUR frame based on information previously received from the AP.

For example, through the PCR module of FIG. 22 (or WLAN), the AP may transmit a WUR Action frame (in the case of FIG. 22, Enter WUR Mode Signaling Response frame) to the STA.

For example, the WUR Action frame may include WID Size (N) information. Here, a value of N may be a natural number greater than 1 and less than or equal to 12.

Figure 23:
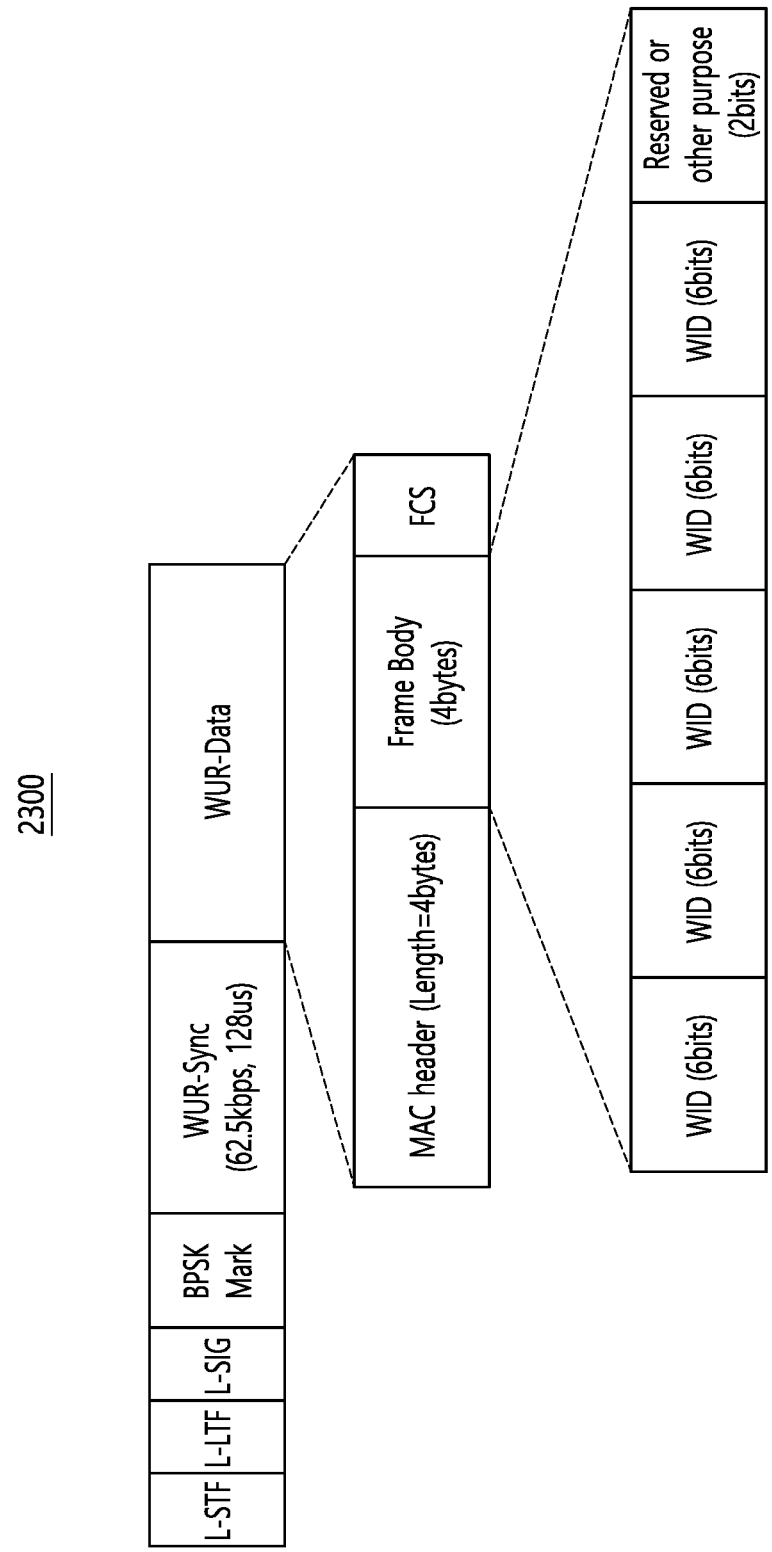
FIGS. 23 and 24 illustrate a format structure of a VL WUR frame depending on a transmission rate according to yet another embodiment of the present disclosure.
Figure 24:
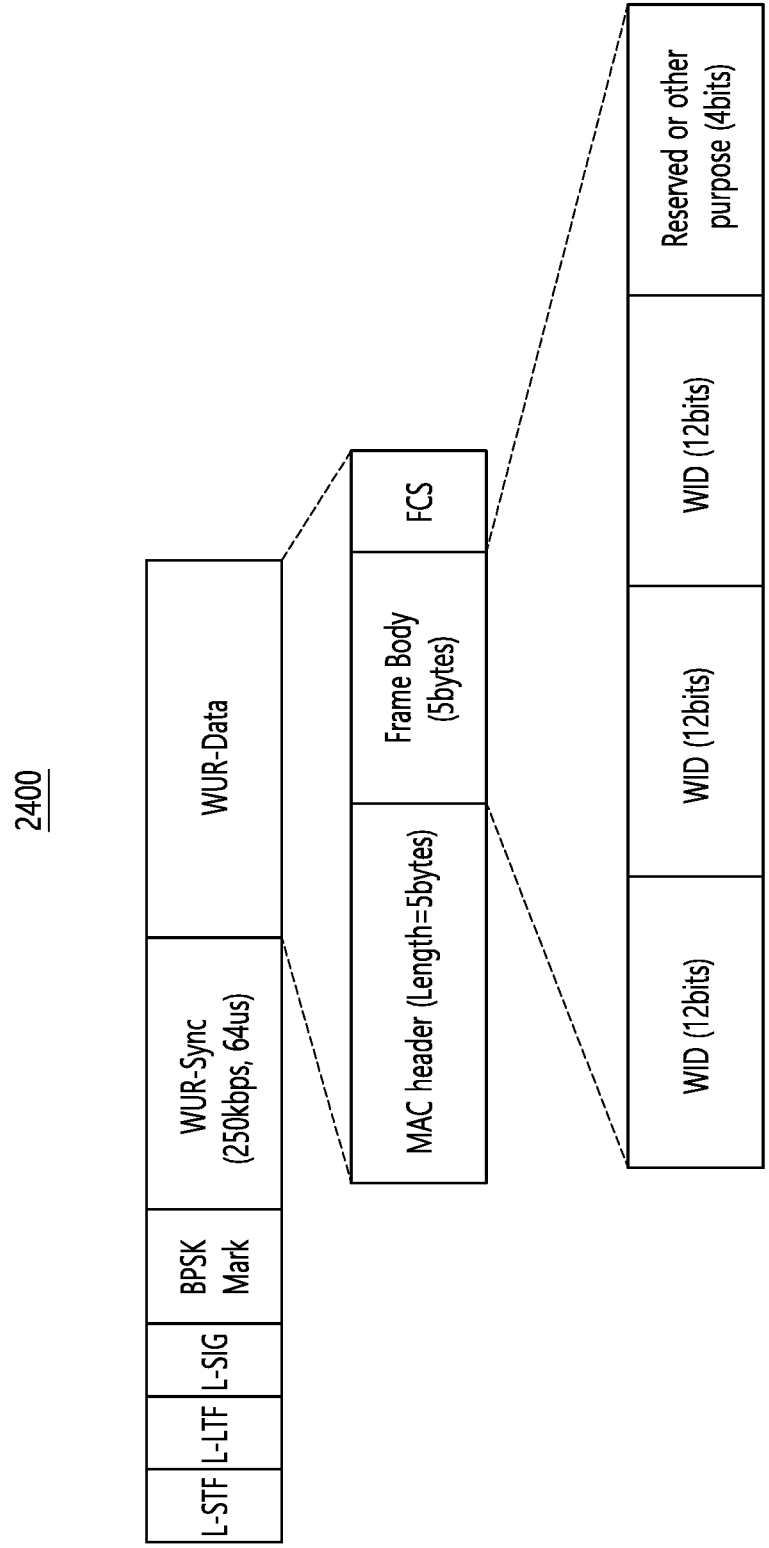

FIGS. 23 and 24 illustrate a format structure of a VL WUR frame depending on a transmission rate according to yet another embodiment of the present disclosure.

Referring to FIG. 23, when an LDR for a VL WUR frame 2300 is 62.5 kbps, identification information field (e.g., WID) for a wireless terminal may be set to 6 bits (or 8 bits).

For example, the VL WUR frame 2300 may include five identification information fields (e.g., WIDs) each having a size of 6 bits.

Referring to FIG. 24, when an HDR for a VL WUR frame 2400 is 250 kbps, an identification information field (e.g., WID) for a wireless terminal may be set to 12 bits (or 10 bits).

For example, the VL WUR frame 2400 may include three identification information fields (that is, WIDs) each having a size of 12 bits.

Figure 25:
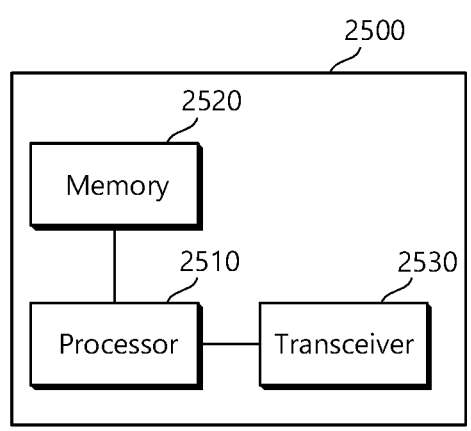
FIG. 25 is a block diagram illustrating a wireless device to which the present embodiment is applicable.

FIG. 25 is a block diagram illustrating a wireless device to which the present embodiment is applicable.

Referring to FIG. 25, a wireless device is an STA capable of implementing the above-described embodiment and may operate as an AP or a non-AP STA. In addition, the wireless device may correspond to the above-described user or a transmission device that transmits a signal to the user.

A wireless device of FIG. 25 includes a processor 2510, a memory 2520, and a transceiver 2530, as illustrated. Each of the processor 2510, the memory 2520, and the transceiver 2530 may be implemented as separate chips, at least two or more blocks/functions may be implemented using one chip.

The transceiver 2530 is a device including a transmitter and a receiver, and when a specific operation is performed, only one of the transmitter and receiver or both of the transmitter and receiver operations may operate. The transceiver 2530 may include one or more antennas that transmit and/or receive wireless signals. In addition, the transceiver 2530 may include an amplifier for amplifying a received signal and/or a transmitted signal and a band pass filter for transmission on a specific frequency band.

The processor 2510 may implement functions, processes, and/or methods proposed in this specification. For example, the processor 2510 may perform an operation according to the present embodiment described above. That is, the processor 2510 may perform the operations disclosed in the embodiments of FIGS. 1 to 24.

The processor 2510 may include an application-specific integrated circuit (ASIC), a separate chipset, a logic circuit, a data processing unit, and/or a converter for mutually converting a baseband signal and a radio signal. The memory 2520 may include a read-only memory (ROM), a random access memory (RAM), a flash memory, a memory card, a storage medium, and/or other equivalent storage devices.

Although embodiments of the present disclosure have been described in detail in the present specification, various modifications are possible without departing from the scope of the present specification. Therefore, the scope of the present specification should not be construed as being limited to the aforementioned embodiments, but should be defined by not only claims of the specification described below but also equivalents to the claims.

The invention claimed is:

1. A method in a wireless Local Area Network (LAN) system, the method comprising:
   transmitting, by a station (STA) comprising a primary connectivity radio (PCR) and a wake-up radio (WUR), a WUR action request frame to an access point (AP),
   wherein the WUR action request frame comprises an action field having a pre-defined value for entering a WUR mode;
   receiving, by the STA, a WUR action response frame from the AP,
   wherein the WUR action response frame comprises an action field having the pre-defined value,
   wherein the WUR action response frame further comprises a WUR identifier (WID) size field related to a bit length of a WID allocated by the AP;
   receiving, by the STA, a wake-up packet modulated based on an On-Off Keying (OOK) technique from the AP,
   wherein the wake-up packet comprises a legacy signal (L-SIG) field being contiguous to at least one Binary Phase Shift Keying (BPSK) mark field being contiguous to a WUR-sync field being contiguous to a WUR-data field,
   wherein the WUR-data field comprises a Medium Access Control (MAC) header including a frame control field having a length of 8 bits, an identifier (ID) field having a length of 12 bits, and a type dependent control field having a length of 12 bits,
   wherein the MAC header is contiguous to a frame body,
   wherein the frame control field comprises a type field including 3-bit information related to whether the frame body is present in the WUR-data field, a length present field including 1-bit information related to whether a length field is present in the frame control field, and the length field including 3-bit information related to a length of the frame body,
   wherein the frame body comprises a plurality of WIDs, and
   wherein a bit length of each of the plurality of WIDs is set based on the WID size field in the WUR action response frame; and
   determining, by the STA, whether a WID allocated to the STA is included in the plurality of WIDs of the frame body; and
   controlling, by the STA, the PCR to be in an awake state based on the determination.

2. The method of claim 1, wherein each of the plurality of WIDs has a length of 6 bits or 12 bits.

3. The method of claim 1, wherein the WUR action request frame and the WUR action response frame are decoded by the PCR of the STA, and the wake-up packet is decoded by the WUR of the STA.

4. A station (STA) in a wireless Local Area Network (LAN) system, the STA comprising:
   a transceiver comprising a primary connectivity radio (PCR) and a wake-up radio (WUR); and
   a processor coupled to the transceiver,
   wherein the processor is configured to:
      transmit, via the PCR, a WUR action request frame to an access point (AP),
      wherein the WUR action request frame comprises an action field having a pre-defined value for entering a WUR mode;
      receive, via the PCR, a WUR action response frame from the AP,
      wherein the WUR action response frame comprises an action field having the pre-defined value,
      wherein the WUR action response frame further comprises a WUR identifier (WID) size field related to a bit length of a WID allocated by the AP;
      receive, via the WUR, a wake-up packet modulated based on an On-Off Keying (OOK) technique from the AP,
      wherein the wake-up packet comprises a legacy signal (L-SIG) field being contiguous to at least one Binary Phase Shift Keying (BPSK) mark field being contiguous to a WUR-sync field being contiguous to a WUR-data field,
      wherein the WUR-data field comprises a Medium Access Control (MAC) header including a frame control field having a length of 8 bits, an identifier (ID) field having a length of 12 bits, and a type dependent control field having a length of 12 bits,
      wherein the MAC header is contiguous to a frame body,
      wherein the frame control field comprises a type field including 3-bit information related to whether the frame body is present in the WUR-data field, a length present field including 1-bit information related to whether a length field is present in the frame control field, and the length field including 3-bit information related to a length of the frame body,
      wherein the frame body comprises a plurality of WIDs, and
      wherein a bit length of each of the plurality of WIDs is set based on the WID size field in the WUR action response frame; and
      determine whether a WID allocated to the STA is included in the plurality of WIDs of the frame body; and
      control the PCR to be in an awake state based on the determination.

5. The STA of claim 4, wherein each of the plurality of WIDs has a length of 6 bits or 12 bits.

6. The STA of claim 4, wherein the WUR action request frame and the WUR action response frame are decoded by the PCR of the STA, and the wake-up packet is decoded by the WUR of the STA.

* * * * *